(12) United States Patent
Grosman et al.

(10) Patent No.: US 9,019,984 B2
(45) Date of Patent: Apr. 28, 2015

(54) SELECTING WIRELESS ACCESS POINTS FOR GEOFENCE MONITORING

(75) Inventors: Yefim Grosman, Sunnyvale, CA (US); Lukas M. Marti, Santa Clara, CA (US); Morgan Grainger, Sunnyvale, CA (US); Robert Mayor, Half Moon Bay, CA (US); Ronald K. Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 737 days.

(21) Appl. No.: 13/153,268

(22) Filed: Jun. 3, 2011

(65) Prior Publication Data

US 2012/0307645 A1    Dec. 6, 2012

(51) Int. Cl.
| | |
|---|---|
| *H04J 3/16* | (2006.01) |
| *H04B 7/26* | (2006.01) |
| *H04W 4/02* | (2009.01) |
| *H04M 1/725* | (2006.01) |
| *H04W 48/20* | (2009.01) |

(52) U.S. Cl.
CPC ............. *H04B 7/2643* (2013.01); *H04W 4/021* (2013.01); *H04M 1/72577* (2013.01); *H04W 48/20* (2013.01)

(58) Field of Classification Search
None
See application file for complete search history.

(56) References Cited

U.S. PATENT DOCUMENTS 7,273,172 B2 *    9/2007    Olsen et al. .................... 235/385

(Continued)

FOREIGN PATENT DOCUMENTS

| | | |
|---|---|---|
| JP | 2006-013577 | 1/2006 |
| WO | 2004/021684 | 3/2004 |
| WO | 2009/086278 | 7/2009 |
| WO | 2009/152472 | 12/2009 |

OTHER PUBLICATIONS

Anmol Sheth et al: "Geo-fencing: Confining Wi-Fi Coverage to Physical Boundaries", May 11, 2009, Pervasive Computing, Springer Berlin Heidelberg, Berlin, Heidelberg, pp. 274-290, XP019117457, ISBN: 978-3-642-01515-1 the whole document.*
Alotabi, Faihan et al. "A Real-Time Intelligent Wireless Mobile Station Location Estimator with Application to TETRA Network." *IEEE Transactions on Mobile Computing*, vol. 8, No. 11. Published Nov. 2009. 15 Pages.
International Search Report and Written Opinion for International Application No. PCT/US2012/038002, filed May 15, 2012, received Sep. 11, 2012. 11 pages.

(Continued)

*Primary Examiner* — Hassan Phillips
*Assistant Examiner* — Mark A Mais
(74) *Attorney, Agent, or Firm* — Fish & Richardson P.C.

(57) ABSTRACT

Methods, program products, and systems for monitoring geofence exits using wireless access points are disclosed. In general, in one aspect, the mobile device can select, from multiple wireless access points, one or more wireless access points for monitoring a geofence. Selecting the one or more wireless access points can include determining multiple geographic regions corresponding to the geofence. The mobile device can select the one or more wireless access points based on a maximum total number of wireless access points to be selected and an access point allowance for each of the geographic regions. The access point allowance can indicate a maximum number of wireless access points to be selected for the geographic region. The mobile device can detect a potential entry or exit of the geofence by monitoring the selected one or more wireless access points using a wireless processor.

45 Claims, 24 Drawing Sheets

(56) References Cited

U.S. PATENT DOCUMENTS

| | | |
|---|---|---|
| 7,493,211 B2 | 2/2009 | Breen |
| 8,301,765 B2 * | 10/2012 | Goodman .................... 709/224 |
| 8,471,701 B2 * | 6/2013 | Yariv et al. ............... 340/539.13 |
| 2006/0200305 A1 | 9/2006 | Sheha et al. |
| 2007/0244633 A1 * | 10/2007 | Phillips et al. ................ 701/207 |
| 2008/0125965 A1 | 5/2008 | Carani et al. |
| 2008/0162034 A1 | 7/2008 | Breen |
| 2009/0005061 A1 * | 1/2009 | Ward et al. ................. 455/456.1 |
| 2010/0017126 A1 | 1/2010 | Holcman et al. |

OTHER PUBLICATIONS

Sheth, Anmol et al. "Geo-fencing: Confining Wi-Fi Coverage to Physical Boundaries." Pervasive Computing, Springer Berlin Heidelberg. Published May 11, 2009. 17 pages.

\* cited by examiner

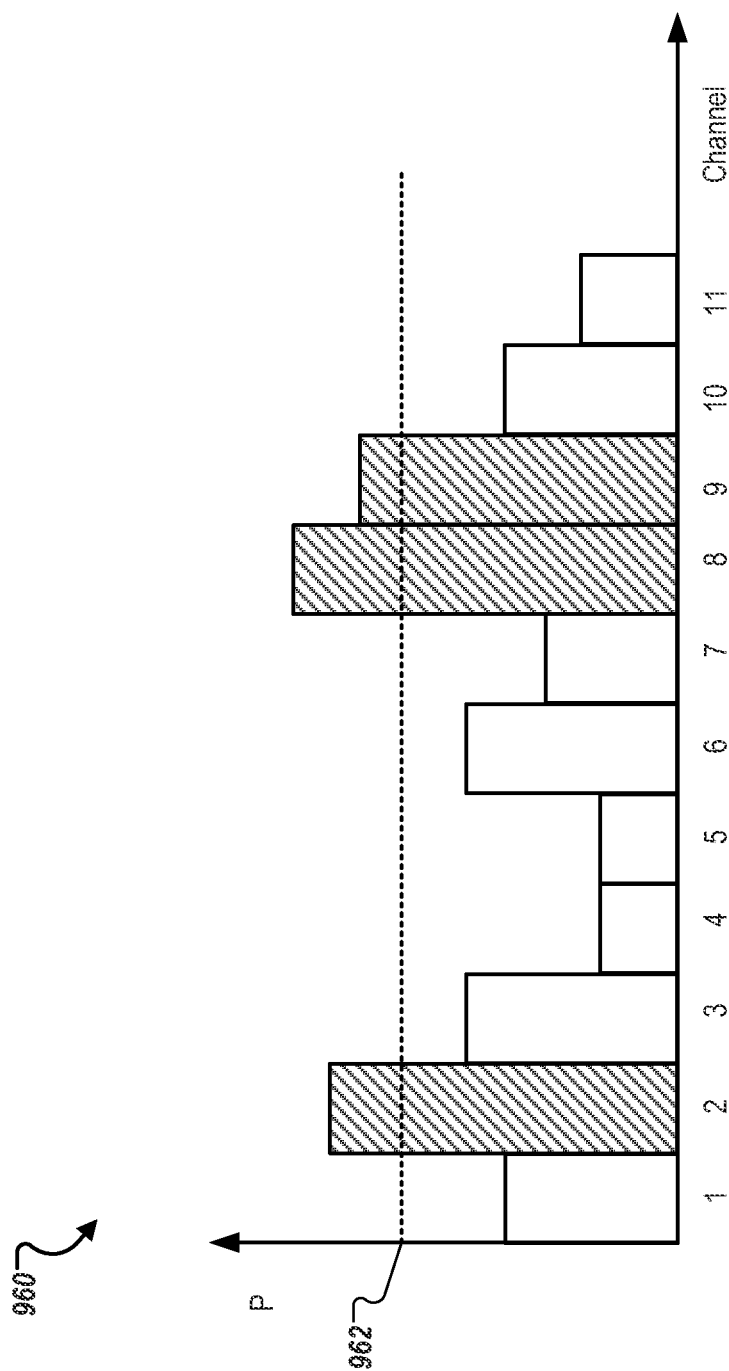

SELECTING WIRELESS ACCESS POINTS FOR GEOFENCE MONITORING

TECHNICAL FIELD

This disclosure relates generally to location-based processing on a mobile device.

BACKGROUND

A modern mobile device can incorporate functions of a computer, a cellular transceiver, and a wireless (e.g., WiFi™) transceiver. For example, the mobile device can perform traditional computer functions, such as executing application programs, storing various data, and displaying digital images. These functions can be performed in an application subsystem of the mobile device. The application subsystem can include an application processor, an application operating system, and various input/output devices. Using the cellular transceiver, the mobile device can function as a cellular phone. Using the wireless transceiver, the mobile device can access a communications network through one or more wireless access points.

Some of the functions performed by a mobile device can be functions based on a geofence. A geofence can include a virtual boundary of a real-world geographic area. The mobile device can be programmed to perform a task when the mobile device is located inside of a geofence. The mobile device can determine whether the mobile device is located inside of a geofence by comparing a location of the mobile device with coordinates of the geographic area. A conventional mobile device can determine the current location using cell tower triangulation or global positioning system (GPS) functions. The application processor of the mobile device can perform the triangulation or GPS calculations.

SUMMARY

Methods, program products, and systems for monitoring a geofence using wireless access points are disclosed. In general, in one aspect, a mobile device receives data defining the geofence. The mobile device can select, from multiple wireless access points, one or more wireless access points for monitoring the geofence. The selected wireless access points can be monitored by a wireless processor of the mobile device. The wireless processor can detect a potential entry of the geofence when at least one of the selected one or more wireless access points is detected. Upon a detection of the potential entry of the geofence by the wireless processor, the mobile device can wake an application processor of the mobile device to determine whether the mobile device is inside of the geofence.

In another aspect, a mobile device can detect one or more entry gateways that are wireless access points selected for monitoring a geofence. The mobile device can determine that the mobile device is located in the geofence based on the detection. The mobile device can monitor the entry gateways and one or more exit gateways, which can be wireless access points observable by the mobile device when the mobile device is in the geofence. When the mobile device determines, after a number of scans using a wireless processor, that the entry gateways and exit gateways are unobservable, the mobile device can use an application processor to determine whether the mobile device has exited from the geofence.

In another aspect, a mobile device can monitor multiple geofences simultaneously. The mobile device can create a temporary geofence based on a current location of the mobile device. The mobile device can designate one or more wireless access points observable from each of the multiple geofences as common gateways for monitoring the temporary geofence. When the mobile device determines, after a number of scans using a wireless processor, that the common gateways are unobservable, the mobile device can wake an application processor to determine whether the mobile device has exited from each of the multiple geofences.

In another aspect, a mobile device can receive data defining a geofence. The mobile device can select, from multiple wireless access points, one or more wireless access points for monitoring the geofence. The selected wireless access points can be monitored by a wireless processor of the mobile device. The wireless processor can detect a potential exit of the geofence when none of the selected one or more wireless access points is detected by the wireless processor for a threshold number of consecutive scans. Upon a detection of the potential exit of the geofence by the wireless processor, the mobile device can wake an application processor of the mobile device to determine whether the mobile device exited the geofence.

In another aspect, the mobile device can select, from multiple wireless access points, one or more wireless access points for monitoring a geofence. Selecting the one or more wireless access points can include determining multiple geographic regions corresponding to the geofence. The mobile device can select the one or more wireless access points based on a maximum total number of wireless access points to be selected and an access point allowance for each of the geographic regions. The access point allowance can indicate a maximum number of wireless access points to be selected for the geographic region. The mobile device can detect a potential entry or exit of the geofence by monitoring the selected one or more wireless access points using a wireless processor. Upon a detection of the potential entry or exit of the geofence by the wireless processor, the mobile device can wake an application processor of the mobile device to determine whether the mobile device is inside or outside of the geofence.

The techniques described in this specification can be implemented to achieve the following advantages. Battery power can be conserved. Geofence monitoring can require constant or frequent location identification. The location identification is conventionally performed by an application processor. A mobile device implementing the described technology can monitor a geofence using a wireless processor (e.g., a WiFi™ chip), which often consumes less power than the application processor. The application processor can be put to an inactive mode, and be awakened when a location of the mobile device relative to the geofence has changed. Thus, the constant or frequent location identification operations can be performed by a less power-hungry component most of the time.

A relative position between a mobile device and a geofence can be detected by monitoring wireless access points using a wireless processor with limited scanning capacity without sacrificing accuracy. A geofence can be associated with more wireless access points than the wireless processor can monitor. A mobile device can select, using techniques described in this specification, a number of statistically more important wireless access points for scanning. Thus, the mobile device can monitor the geofence under constraints of the capacity of the wireless processor, or monitor multiple geofences at the same time.

The details of one or more implementations of the subject matter of this specification are set forth in the accompanying drawings and the description below. Other features, aspects, and advantages of subject matter will become apparent from the description, the drawings, and the claims.

BRIEF DESCRIPTION OF THE DRAWINGS

FIGS. 8A and 8B are diagrams illustrating exemplary wireless access point allowances used in identifying candidate wireless access points for selection.

FIG. 9D is an exemplary histogram illustrating techniques of identifying candidate wireless access points based on channel optimization.

Like reference symbols in the various drawings indicate like elements.

DETAILED DESCRIPTION

Exemplary Detection of a Geofence

Figure 1A:
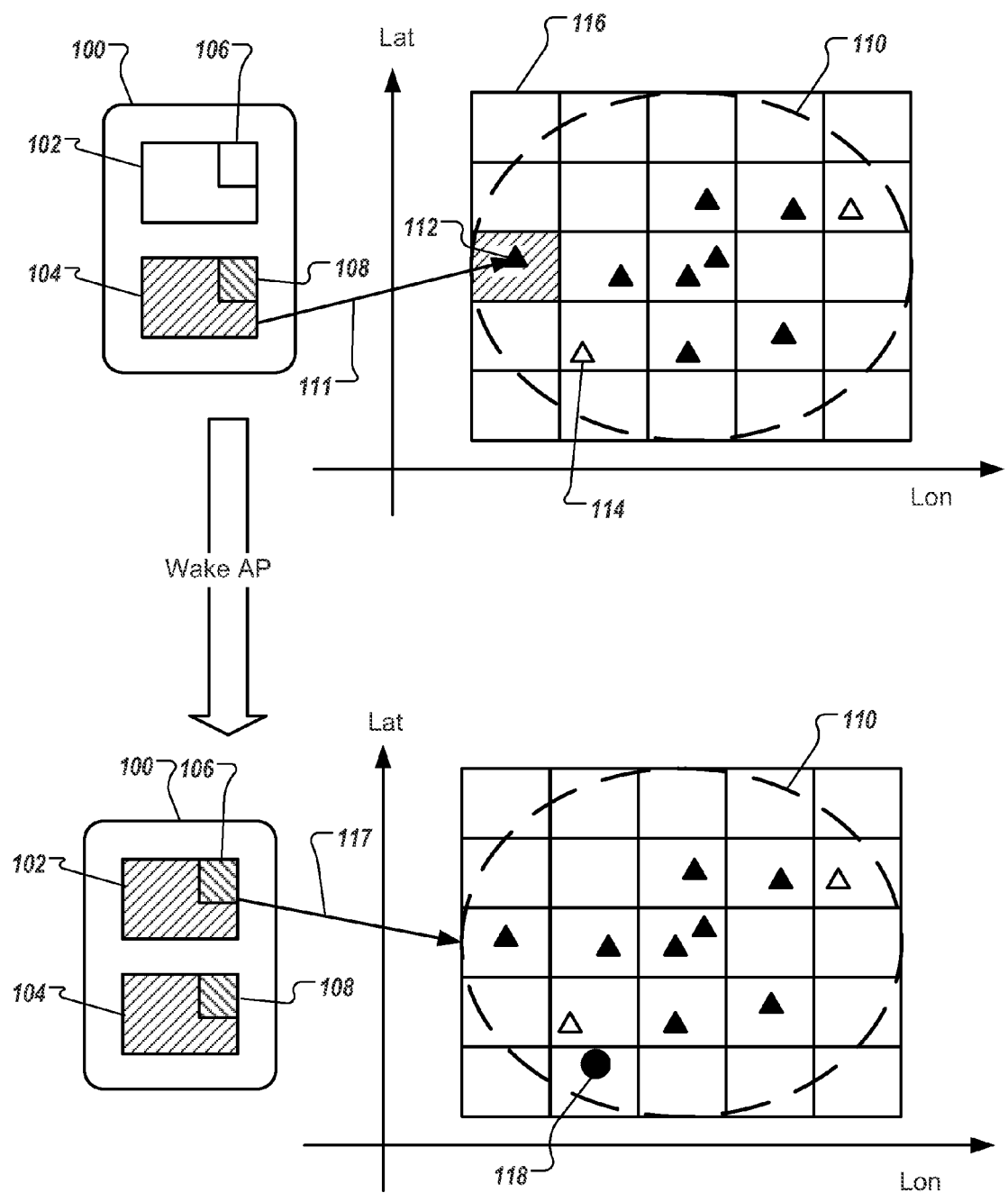
FIGS. 1A-1C are diagrams illustrating exemplary techniques of monitoring a geofence.
Figure 1B:
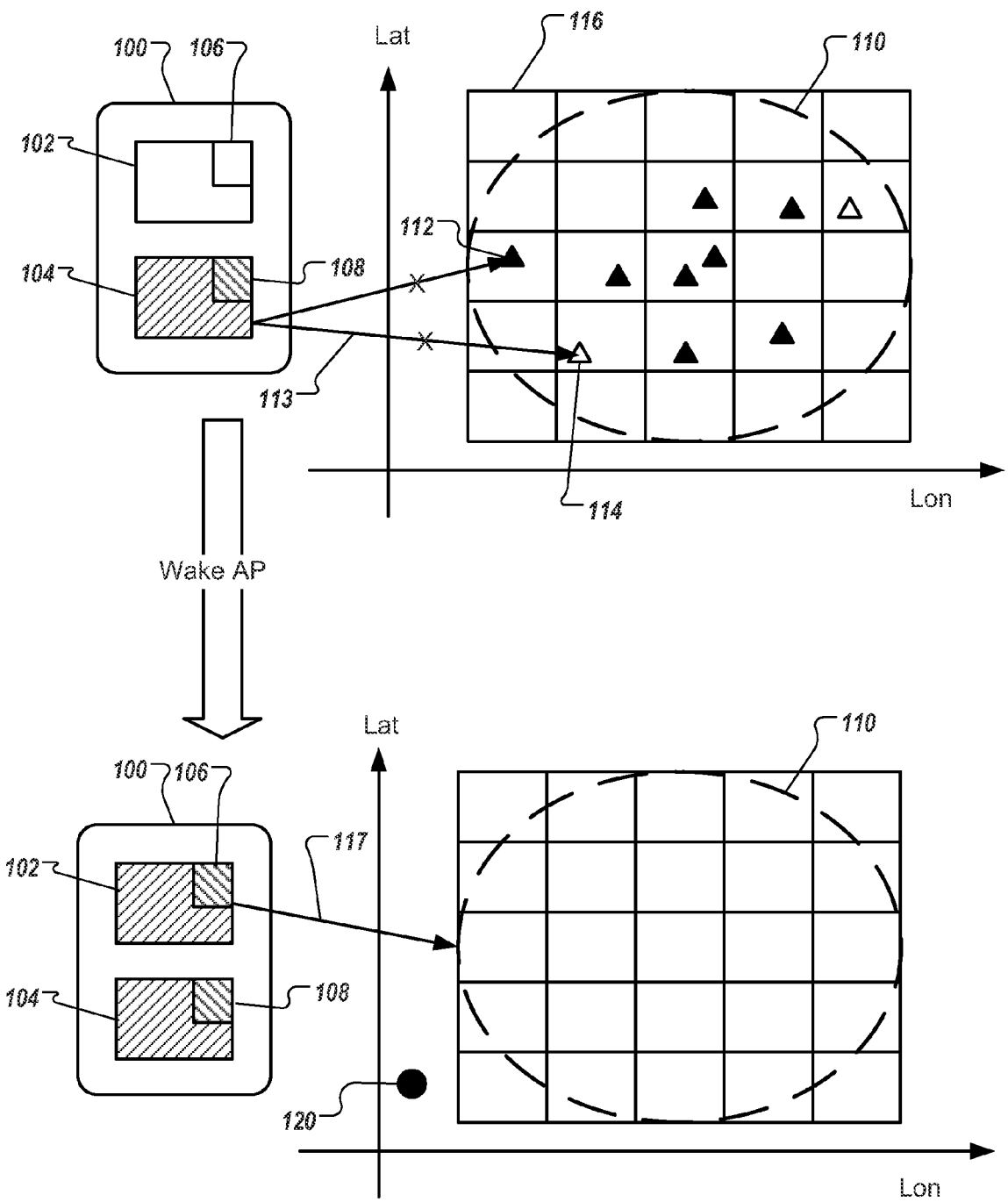

FIGS. 1A and 1B are diagrams illustrating exemplary techniques of detecting a geofence. Detecting a geofence can include detecting whether a mobile device is located inside or outside of a geofence. FIG. 1A is a diagram illustrating exemplary techniques of detecting an entry into a geofence by mobile device 100.

Mobile device 100 can be an exemplary mobile device that implements the techniques of detecting a geofence. Mobile device 100 can include application subsystem 102 that includes an application processor, wireless communications subsystem 104 that includes a wireless processor, and a baseband subsystem that includes a baseband processor.

Mobile device 100 can be configured to detect a potential entry into geofence 110 using wireless communication subsystem 104. Geofence 110 can include a fence location (e.g., a center of the fence) and a fence dimension (e.g., a radius when the fence is a circle). The fence location can include latitude and longitude coordinates. Geofence 110 can be associated with an entity (e.g., a company, school, or home).

To detect the potential entry into geofence 110, mobile device 100 can select one or more wireless access points for monitoring. The one or more wireless access points can be selected from wireless access points determined to be detectable from a mobile device when a mobile device is located in geofence 110. The selected one or more wireless access points are represented in FIG. 1A and other figures as black triangles. The selected one or more wireless access points can include wireless access point 112. Not all wireless access points that are detectable from a mobile device when a mobile device is located in geofence 110 need to be selected for monitoring geofence 110. For example, wireless access point 114 can be such a wireless access point not selected by mobile device 100. In FIG. 1A and other figures, the wireless access points that are (a) detectable from mobile device 100 when mobile device 100 is located in geofence 110 and (b) not selected by mobile device 100 for monitoring are represented as white triangles. The selection is facilitated by virtual geographic grid 116. Virtual geographic grid 116 is a geographic area corresponding to geofence 110 that is created by mobile device 100 for determining which wireless access point to select. Further details of selecting wireless access points are described below in reference to FIGS. 6-15.

Mobile device 100 can monitor an entry into geofence 110 by scanning signals from the selected one or more wireless access points using wireless communications subsystem 104. Wireless communications subsystem 104 can include a wireless processor and fence detection instructions 108. Execution of fence detection instructions 108 can cause the wireless processor to scan one or more communication channels to detect signals from wireless access points and device identifiers of the wireless access points. The device identifier of a wireless access point can include, for example, a media access control (MAC) address of the wireless access point. If the scan detects a device identifier and the device identifier matches a device identifier of one of the selected wireless access points, a potential fence entry can be detected. Mobile device 100 can scan signals continuously or frequently without draining a battery, when wireless communications subsystem 104 consumes a small amount of power during each scan.

In this example, wireless communications subsystem 104 of mobile device 100 detects (111) a signal associated with a device identifier matching that of wireless access point 112. Accordingly, wireless communications subsystem 104 detects a potential entry into geofence 110. Upon the detection of the potential entry, wireless communications subsystem 104 can activate application subsystem 102. Activating application subsystem 102 can include, for example, waking application subsystem 102 from a "sleep" state. Inactive application subsystem 102 is represented as an unshaded block in FIG. 1A and other figures. Activated application subsystem 102 is represented as a shaded block in FIG. 1A and other figures.

Application subsystem 102 can include an application processor and geofence instructions 106. Application subsystem 102 can be configured to, upon being activated by wireless communications subsystem 104, execute geofence instructions 106 to determine whether mobile device 100 entered into geofence 110. Geofence instructions 106 can include location determination instructions and location comparison instructions. The location determination instructions can, upon execution, cause application subsystem 102 to determine a current location of mobile device 100 using various location-determining devices or programs. Determining a current location of mobile device 100 may or may not include operations by wireless communications subsystem 104. The location comparison instructions can, upon execution, cause application subsystem 102 to compare (117) the current location with geofence 110.

If application subsystem 102 determines that the current location is inside of geofence 110 (e.g., at location 118), application subsystem 102 can determine that mobile device 100 entered geofence 110, and perform a task associated with the entry of geofence 110. The task can include, for example, displaying or sounding an alarm, displaying an advertisement, or activating a security measure.

If application subsystem 102 determines that the current location is not in geofence 110, application subsystem 102 can determine that mobile device 100 did not enter geofence 110, and that the potential entry detected by wireless communications subsystem 104 may be an error. Application subsystem 102 can perform error prevention operations regarding wireless access point 112 (e.g., "blacklisting" wireless access point 112). Further details of the error correction operations are described below in reference to FIGS. 3A and 3B.

After determining the current location of mobile device 100 and determining that an entry into geofence 110 did or did not occur, application subsystem 102 can stop monitoring the current location and allows the wireless communications subsystem to continue the scanning for determining a potential entry to another geofence, or for determining a potential exit from geofence 110. Thus, application subsystem 102 can be deactivated (e.g., put to "sleep" mode) while the wireless subsystem continues monitoring geofence 110.

FIG. 1B is a diagram illustrating exemplary techniques of detecting an exit from a geofence. Mobile device 100 can be a device that has determined to be located in geofence 110 using the techniques described in reference to FIG. 1A. Application subsystem 102 of mobile device 100 can be in a deactivated mode (e.g., a "sleep" mode).

Upon detecting that mobile device 100 entered geofence 110, fence detection instructions 108 can cause a wireless processor of wireless communications subsystem 104 to scan wireless access points to detect a potential exit. The wireless processor can scan communication channels for signals from (a) the wireless access points selected based on grid 116, and (b) wireless access points not selected but are detectable by mobile device 100 when mobile device 100 is in geofence 110 (e.g., wireless access point 114). When the wireless processor does not detect (113) a signal from any of wireless access points of (a) and (b) in N consecutive scans, wireless communications subsystem 104 can determine that a potential exit of geofence 110 has occurred. The number N can be a scan threshold.

Upon detecting the potential exit, wireless communications subsystem 104 can activate application subsystem 102. Application subsystem 102 can then determine a current location of mobile device 100 (e.g., location 120) and compare (117) the current location with geofence 110. If, based on the comparison, application subsystem 102 determines that the current location is outside of geofence 110, application subsystem 102 can determine that mobile device 100 exited geofence 110. Wireless communications subsystem 104 can then scan the wireless access points selected based on grid 116 and determine whether there is another potential entry into geofence 110. In some implementations, mobile device 100 can monitor multiple wireless access points to monitor multiple geofences.

Figure 1C:
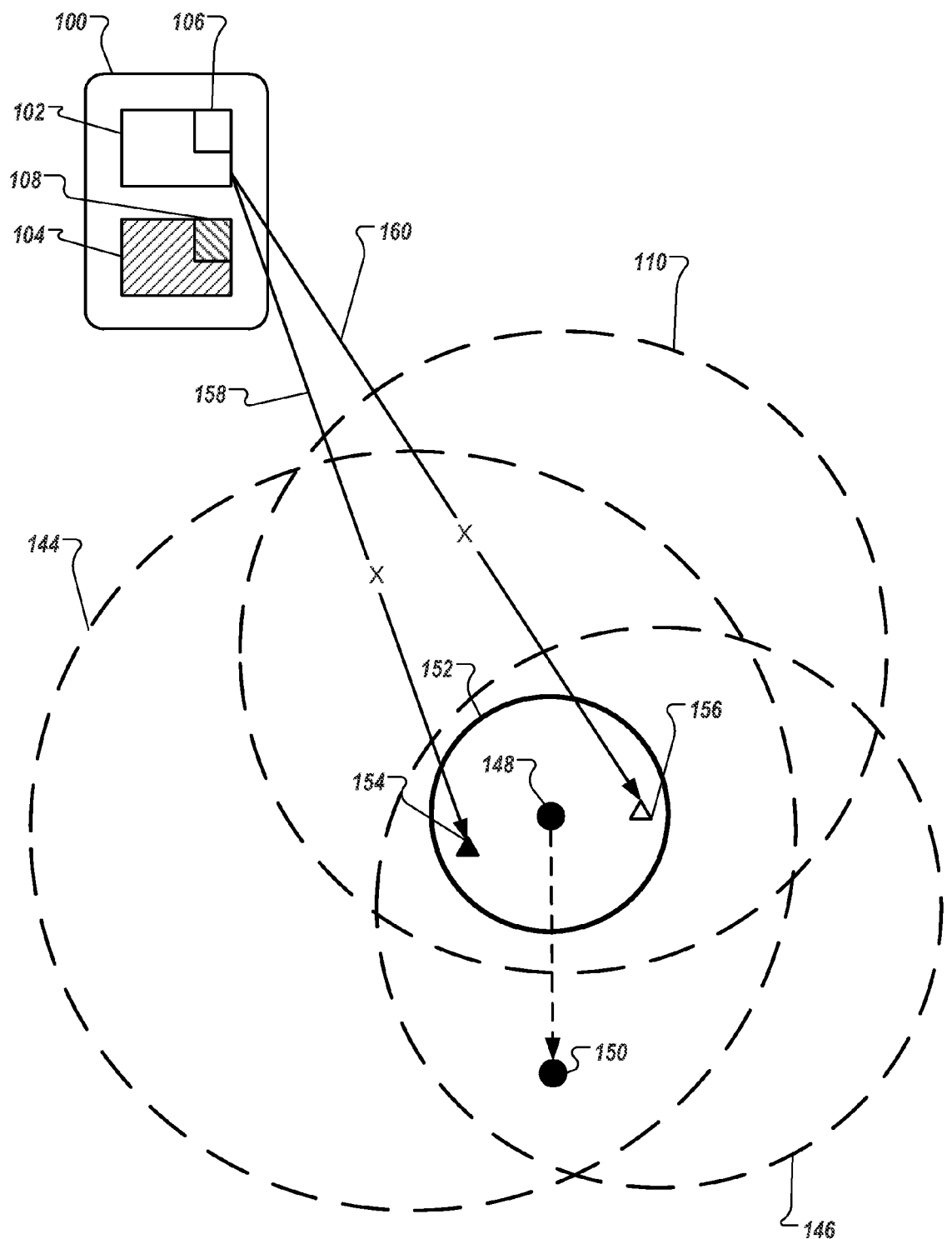

FIG. 1C is a diagram illustrating exemplary techniques of detecting an exit from a geofence when multiple geofences are monitored. Mobile device 100 can be a device that has determined to be located in geofence 110 using the techniques described in reference to FIGS. 1A and 1B. Application subsystem 102 of mobile device 100 can be in a deactivated mode (e.g., a "sleep" mode).

In addition to geofence 110, mobile device 100 can be located in geofences 144 and 146. Geofences 144 and 146 can be geofences that intersect geofence 110. Each of geofences 110, 144, and 146 can correspond to a set of wireless access points for monitoring the respective geofence. Mobile device 100 can move in such a way that mobile device enters and exits a geofence (e.g., geofence 110) while remaining in the other geofences (e.g., geofences 144 and 146). For example, mobile device 100 can move from location 148 (which is inside each of geofences 110, 144, and 146) to location 150 (which is inside of geofences 144 and 146, but outside of geofence 110).

Mobile device 100 can monitor geofences 110, 144, and 146 by creating temporary geofence 152. Mobile device 100 can create temporary geofence 152 based on a current location of mobile device 100 when mobile device 100 is located in multiple geofences. For example, when an application processor of mobile device 100 determines that mobile device 100 in geofence 110 and geofence 144, mobile device 100 can create a first temporary geofence. When the application processor determines that mobile device 100 subsequently entered geofence 146 while still in geofences 110 and 144, mobile device 100 can create temporary geofence 152. Mobile device 100 can designate the current location (e.g., location 148) as a location of temporary geofence 152. Mobile device 100 can designate a specified dimension (e.g., 100 meters) as a dimension (e.g., a radius) of temporary geofence 152.

Mobile device 100 can designate one or more exit gateways for monitoring temporary geofence 152. The exit gateways can be selected from wireless access points located within temporary geofence 152 or otherwise related to temporary geofence 152. The exit gateways can be wireless access points observable from geofences 110, 142, and 146 in which mobile device 100 is located. The exit gateways can include wireless access point 154, which was previously selected by mobile device 100 to monitor at least one of geofences 110, 142, or 146. The exit gateways can include wireless access point 156, which was not previously selected for monitoring a geofence but is observable by mobile device 100 when mobile device 100 is located at location 148.

Upon creating temporary geofence 152 and designating the exit gateways (e.g., wireless access points 154 and 156), fence detection instructions 108 can cause a wireless processor of wireless communications subsystem 104 to scan the exit gateways to detect a potential exit. The wireless processor can scan (158 and 160) communication channels for signals from the exit gateways. When the wireless processor does not detect a signal from any of the exit gateways in N consecutive scans, wireless communications subsystem 104 can determine that a potential exit of temporary geofence 152 has occurred. The number N can be a scan threshold.

Upon detecting the potential exit from temporary geofence 152, wireless communications subsystem 104 can activate application subsystem 102. Application subsystem 102 can then determine new location 150 of mobile device 100 and compare new location 150 with each of the geofences 110, 144, and 146. If, based on the comparison, application subsystem 102 determines that new location 150 is outside of geofence 110, but still in geofence 144 and 146, application subsystem 102 can determine that mobile device 100 exited geofence 110. Mobile device 100 can then create a new temporary geofence and associate a new set of exit gateways for monitoring the new temporary geofence, and thus monitoring exit of geofence 144 and 146. Mobile device 100 can monitor wireless access gateways associated with geofence 110 for re-entry into geofence 110.

Exemplary Fence Detection System

Figure 2:
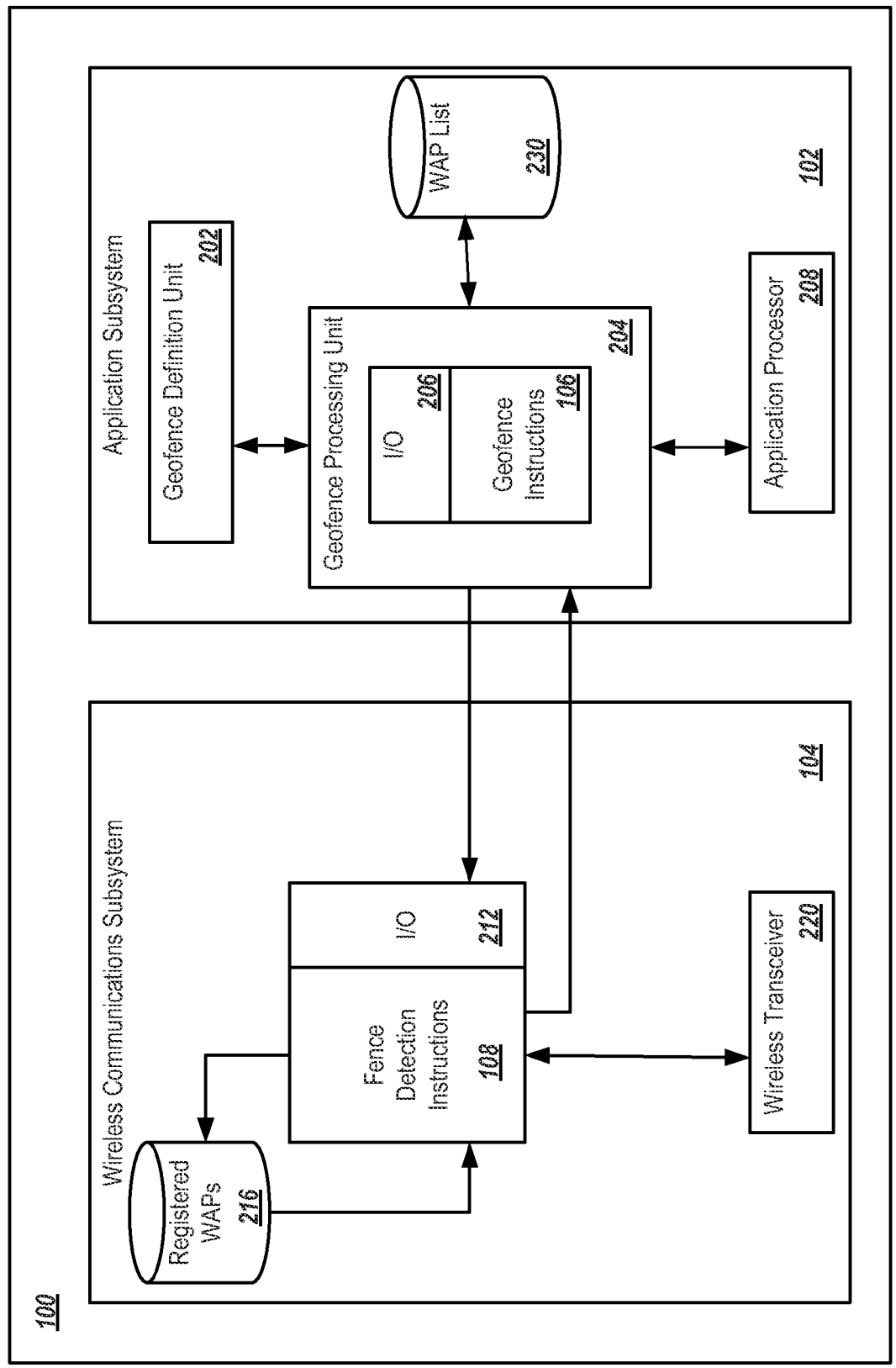
FIG. 2 is a block diagram illustrating exemplary components of a system implementing techniques of monitoring a geofence using wireless access points.

FIG. 2 is a block diagram illustrating exemplary components of a system implementing techniques of monitoring a geofence using wireless access points. The system can be implemented on mobile device 100 as described above in reference to FIGS. 1A and 1B.

Mobile device 100 can include application subsystem 102. Application subsystem 102 can include software and hardware components configured to perform operations of geofence detection. Application subsystem 102 can include geofence definition unit 202. Geofence definition unit 202 is a component of application subsystem 102 configured to receive data defining a geofence. Geofence definition unit 202 can receive the data defining the geofence from a user interface (e.g., a touch-sensitive display screen), from a remote server, or from an application program executing on mobile device 100.

The data received by geofence definition unit 202 can be processed by geofence processing unit 204. Geofence processing unit 204 can be a component of application subsystem configured to perform operations relating to geofence detection. Geofence processing unit 204 can include geofence instructions 106 and geofence interface 206. Geofence interface 206 can be a component of geofence processing unit 204 configured to interface between a system component (e.g., geofence definition unit 202) and geofence instructions 106.

Geofence instructions 106 can include instructions that, upon execution, cause application processor 208 to perform various operations. The operations can include access point selection operations and location determination operations. When performing the access point selection operations, application processor 208 can select, based on the data defining the geofence received from geofence definition unit 202, one or more wireless access points from data store 230. Data store 230 is a component of application subsystem 102 configured to store a list of identifiers of wireless access points and related information. The data stored in data store 230 can be received from a remote server.

Geofence processing unit 204 can send the selected wireless access points to wireless communications subsystem 104 for monitoring. Wireless communications subsystem 104 can include interface 212 configured to send information to application subsystem 102 or receive information from application subsystem 102. Wireless communications subsystem 104 can include data store 216. Data store 216 is a component of wireless communications subsystem 104 configured to store a list of wireless access points received from application subsystem 102. Wireless communications subsystem 104 can include wireless transceiver 220. Fence detection instructions 108, when executed, can cause wireless transceiver 220 to scan for wireless signals.

In addition to a list of the selected wireless access points, geofence processing unit 204 can send operation modes instructions to wireless communications subsystem 104. The operation modes can include entry detection mode and exit detection mode. When wireless communications subsystem 104 operates under entry detection mode, if wireless transceiver 220 detects a signal from a wireless access point matching one of the wireless access points stored in data store 216, wireless communications subsystem 104 can send an activation signal to application subsystem 102 for detecting an entry. When wireless communications subsystem 104 operates under exit detection mode, wireless communications subsystem 104 can count a number of consecutive scans in which wireless transceiver 220 does not detect any wireless access points that can match the wireless access points stored in data store 216. Then, wireless communications subsystem 104 can send an activation signal to application subsystem 102 for detecting an exit.

Wireless communications subsystem 104 can monitor multiple geofences concurrently, including monitoring the wireless access points for each of the geofences. Wireless communications subsystem 104 can operate in an entry detection mode for one geofence, and in an exit detection mode for another geofence. Some or all components of wireless communications subsystem 104 can be implemented on a wireless processor (e.g., a WiFi™ chip).

Exemplary Error Prevention

Figure 3A:
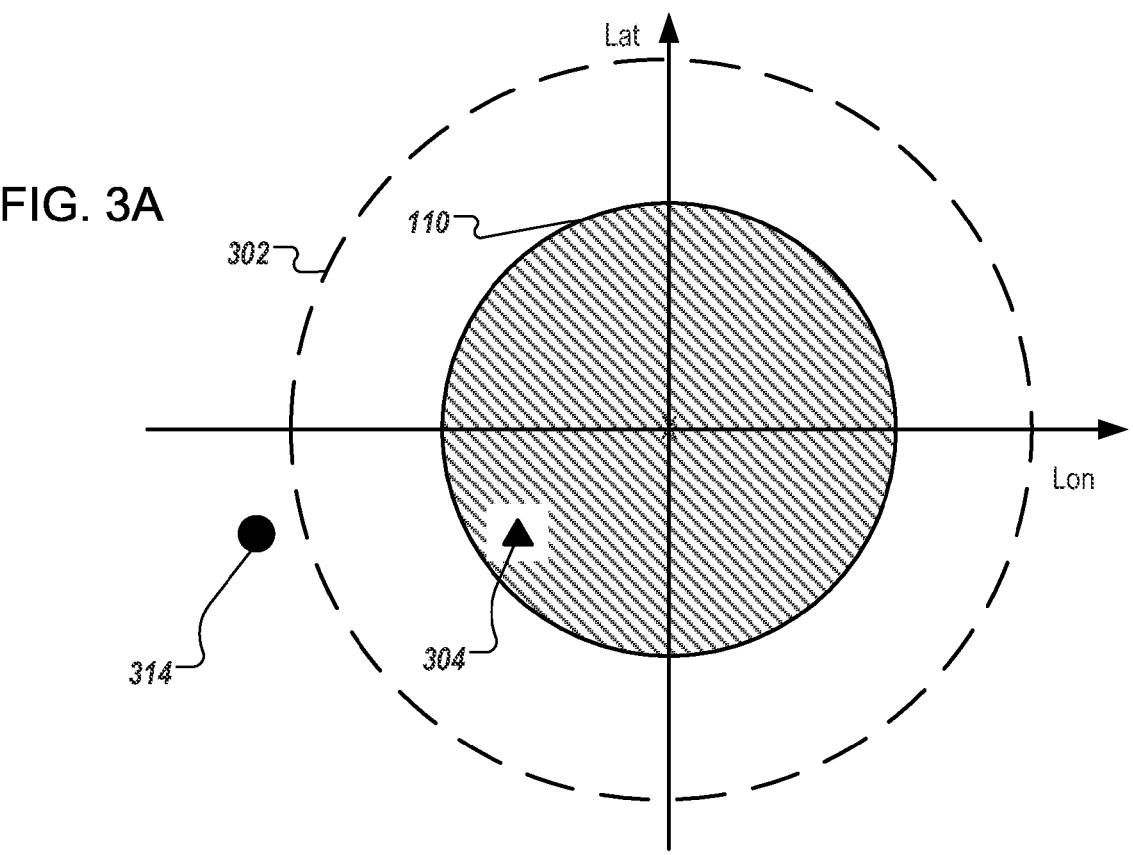
FIGS. 3A and 3B are diagrams illustrating exemplary error prevention techniques in monitoring a geofence.
Figure 3B:
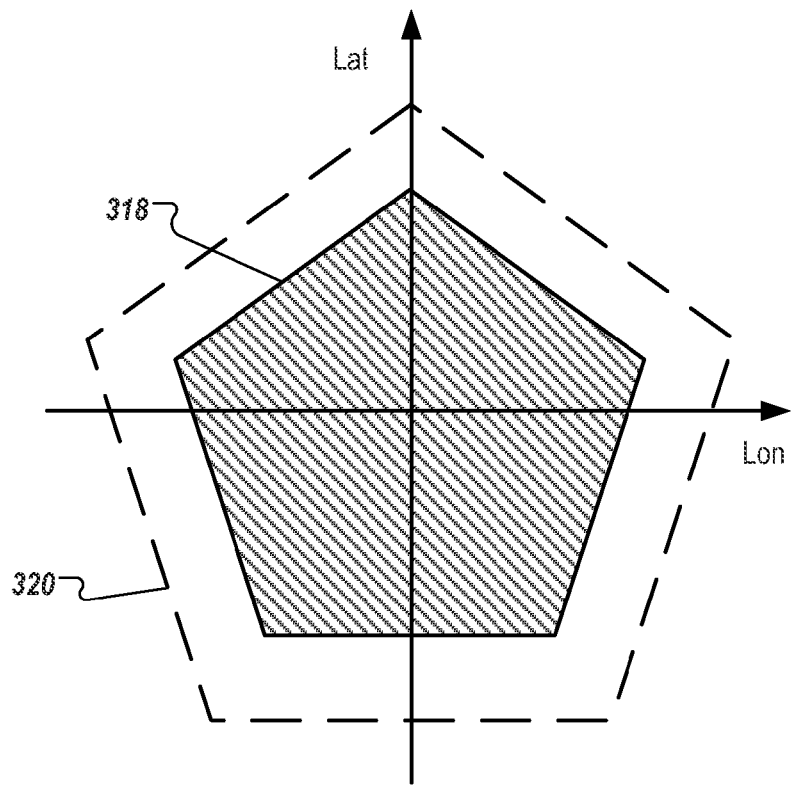

FIGS. 3A and 3B are diagrams illustrating error prevention in monitoring a geofence. False positives of potential geofence entry or exit can occur. A false positive occurs when a wireless processor detects a potential entry of a geofence, but the entry did not actually occur. Error prevention techniques can be utilized to prevent a future false positive based on a known false positive.

FIG. 3A illustrates exemplary geofence 110 and an error tolerance zone 302. Some of the potential entries of mobile device 100 into geofence 110 (as described above in reference to FIGS. 1A-1C, and 2) can be detected when mobile device 100 did not enter into geofence 110. To reduce the false positives, error tolerance zone 302 can be created.

Example geofence 110 is a circular geofence having a center and a radius. Wireless communications subsystem 104 of mobile device 100 can detect a signal from wireless access point 304 designated for monitoring geofence 110. Then, application subsystem can determine that mobile device 100 is located at location 314. If location 314 is outside error tolerance zone 302, mobile device 100 can determine that wireless access point 304 is unreliable for monitoring geofence 110. Accordingly, mobile device 100 can blacklist wireless access point 304. In some implementations, blacklisting wireless access point 304 can include excluding wireless access point 304 from future monitoring. In some implementations, blacklisting wireless access point 304 can include reducing a probability that wireless access point 304 is selected for monitoring geofence 110. For example, mobile device 100 can assign a score to wireless access point 304 that reduces a weight of wireless access point 304 in device selection operations.

Error tolerance zone 302 can be defined using an error tolerance value. The error tolerance value can include a threshold distance from an edge of geofence 110. Thus, if the distance between location 314 and center of geofence 110 is greater than a sum of the radius of geofence 110 and the threshold distance, mobile device 100 can determine that wireless access point 304 is unreliable for monitoring geofence 110.

FIG. 3B illustrates exemplary geofence 318 and an error tolerance zone 320. A geofence can have any shape and size. For example, geofence 318 can be an ellipse defined using a center and a width and a height, or a polygon defined using vertices of the polygon. Error tolerance zone 320 can be defined using a threshold distance from each edge of the ellipse or polygon.

Exemplary Fence Detection Processes

Figure 4A:
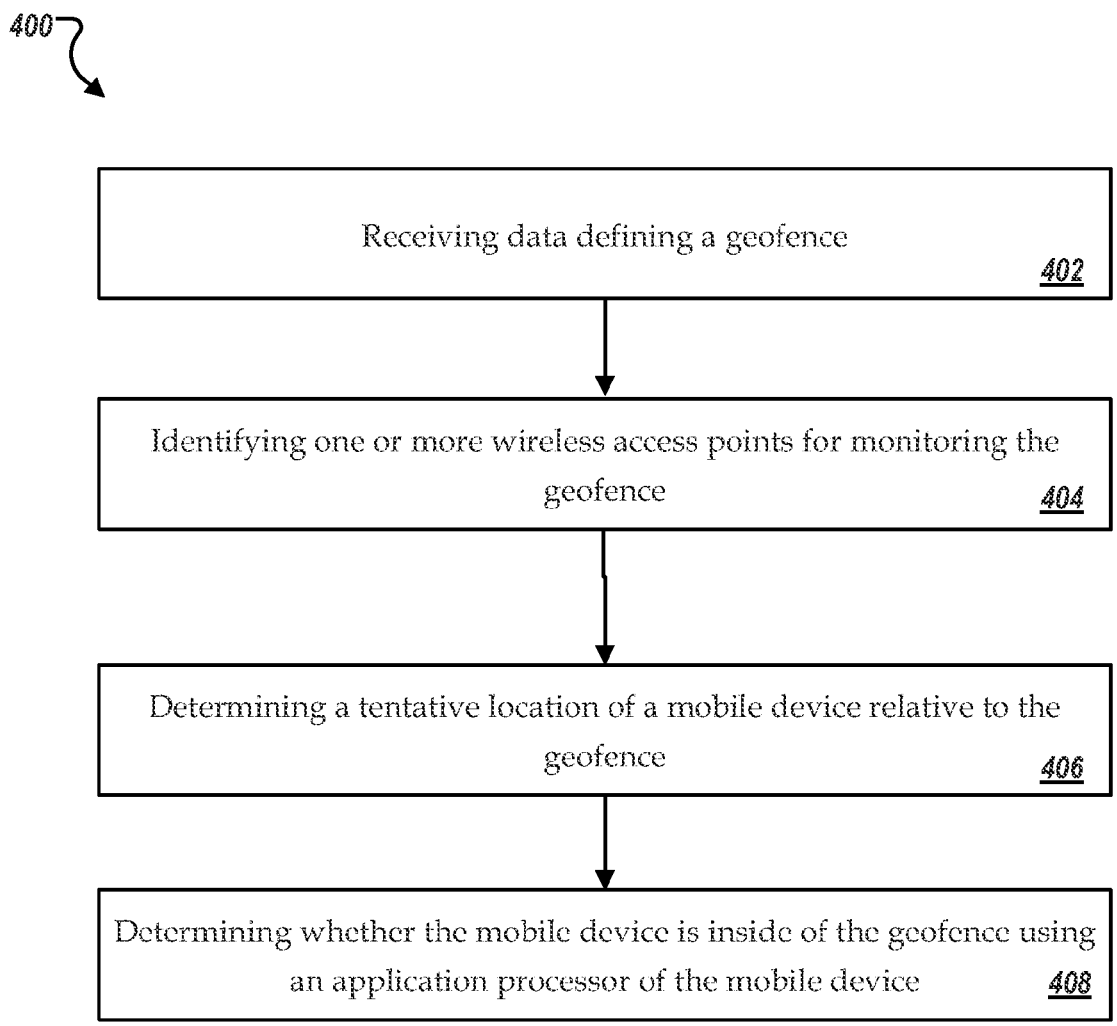
FIGS. 4A-4D are flowcharts illustrating exemplary operations of monitoring a geofence.
Figure 4B:
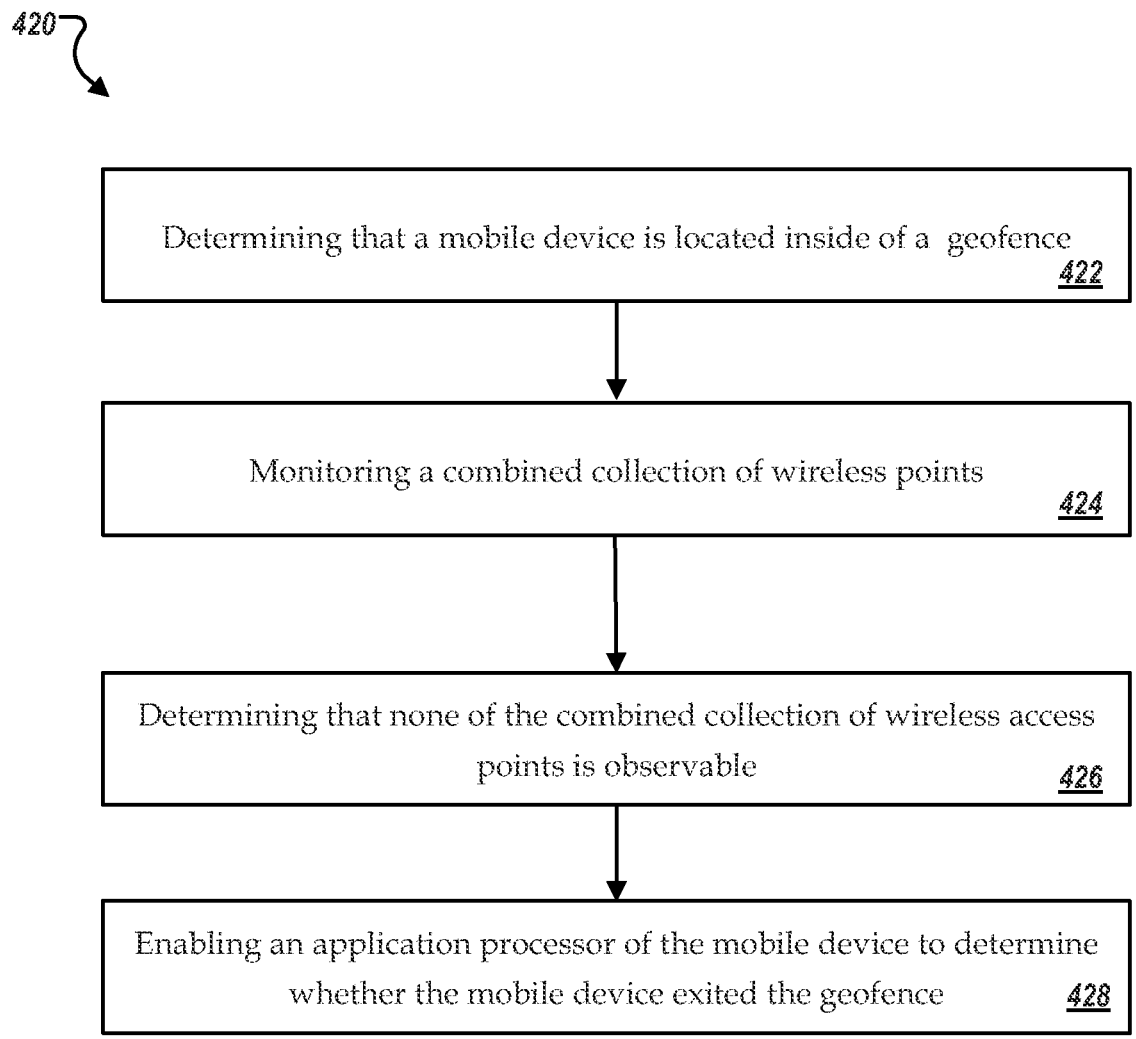

FIGS. 4A and 4B are flowcharts illustrating exemplary operations of monitoring a geofence. FIG. 4A is a flowchart illustrating exemplary operations 400 of monitoring a geofence. The operations can be performed by mobile device 100 as described above in reference to the previous figures.

Mobile device 100 can receive (402) data defining a geofence. The data defining the geofence can include a fence location and a fence dimension. The fence location can include latitude, longitude, and altitude coordinates. The fence location can be a center point of the geofence. The fence dimension can be a radius. The data can be received from a user.

Mobile device 100 can identify (404) one or more wireless access points for monitoring the geofence. Identifying the one or more wireless access points can include selecting the one or more wireless access points from multiple geofences. The selection operations will be described in further details below in reference to FIGS. 6-15.

Mobile device 100 can determine (406) a tentative location of mobile device 100 relative to the geofence. A location of mobile device 100 relative to the geofence can include a location inside of the geofence or a location outside of the geofence. Mobile device 100 can use a wireless processor of the mobile device to determine the tentative location of the mobile device relative to the geofence. To determine the tentative location, mobile device 100 can monitor the one or more identified access points. Monitoring the access points can include scanning, on one or more channels, a signal from the one or more identified wireless access points. Detecting at least one of the one or more identified wireless access points can include receiving a signal associated with a media access control (MAC) address of a wireless access point, the MAC address of the wireless access point matching one of a list of MAC addresses associated with the one or more identified wireless access points. The wireless processor can include a wireless chip that consumes less power than the application processor.

Determining the tentative location of the mobile device relative to the geofence can include detecting a potential entry into the geofence, or detecting a potential exit from a geofence. In a potential entry case, determining the tentative location of the mobile device relative to the geofence can include detecting a potential entry of the geofence when at least one of the one or more identified wireless access points is detected by the wireless processor. In a potential exit case, determining the tentative location of the mobile device relative to the geofence can include detecting a potential exit from the geofence when, in a threshold number of consecutive scans, none of the one or more identified wireless access points and none of the wireless access points detectable in the geofence is detected.

Upon determining the tentative location of the mobile device relative to the geofence by the wireless processor, mobile device 100 can wake an application processor of mobile device 100. Waking the application processor of mobile device 100 can include changing the application processor of mobile device 100 from an inactive state (e.g., power conserving state) to an active state. Mobile device 100 can use the application processor to determine (408) whether mobile device 100 is inside of the geofence. Determining whether mobile device 100 is inside of the geofence can include enabling the application processor of mobile device 100 to determine a current location of mobile device 100, and determine whether the current location is located inside of the geofence. If the application processor of mobile device 100 determines, based on the current location, that an entry has occurred, mobile device 100 can proceed to determine a potential exit using the wireless processor.

If the application processor of mobile device 100 determines that mobile device 100 is located inside of the geofence, the application processor can perform a task related to the geofence. The application processor can set the operation mode of the wireless processor to an exit detection mode. If the wireless processor tentatively determined that mobile device 100 is located inside of the geofence, but the application processor of mobile device 100 determines that mobile device 100 is located outside of and at least a threshold away from the geofence, the application processor can perform error prevention operations. For example, after the wireless processor tentatively determined that mobile device 100 is located inside of the geofence, mobile device 100 can determine, using the application processor, that mobile device 100 is located at a distance away from the geofence. The application processor can determine that the distance exceeds an error threshold. Then, mobile device 100 can designate a detected wireless access point as an unreliable wireless access point, including excluding the wireless access point from future monitoring or decreasing an access point score associated with the wireless access point.

Upon an exit from a geofence, mobile device 100 can set the wireless processor to an entry detection mode.

FIG. 4B is a flowchart illustrating exemplary operations 420 of monitoring a geofence exit. The operations can be performed by mobile device 100 as described above in reference to the previous figures. Mobile device 100 can determine (422), using an application processor of mobile device 100, that mobile device 100 is inside of a geofence.

Mobile device 100 can monitor (424), using the wireless processor, a combined collection of wireless access points. The combined collection of wireless access points can include (a) one or more wireless access points identified in stage 404 as described in reference to FIG. 4A, and (b) one or more currently visible wireless access points. Monitoring the combined collection of wireless access points can include scanning for signals from the combined collection of wireless access points using the wireless processor.

Mobile device 100 can determine (426), that for at least a threshold number of scans, none of the combined collection of wireless access points is observable. Then, mobile device 100 can wake the application processor of mobile device 100. Mobile device 100 can determine (428) whether mobile device 100 exited from the geofence using the application processor. When the application processor of mobile device 100 that mobile device 100 exited from the geofence, mobile device 100 can perform a task associated with the exit from the geofence (e.g., displaying or sounding an alarm).

Figure 4C:
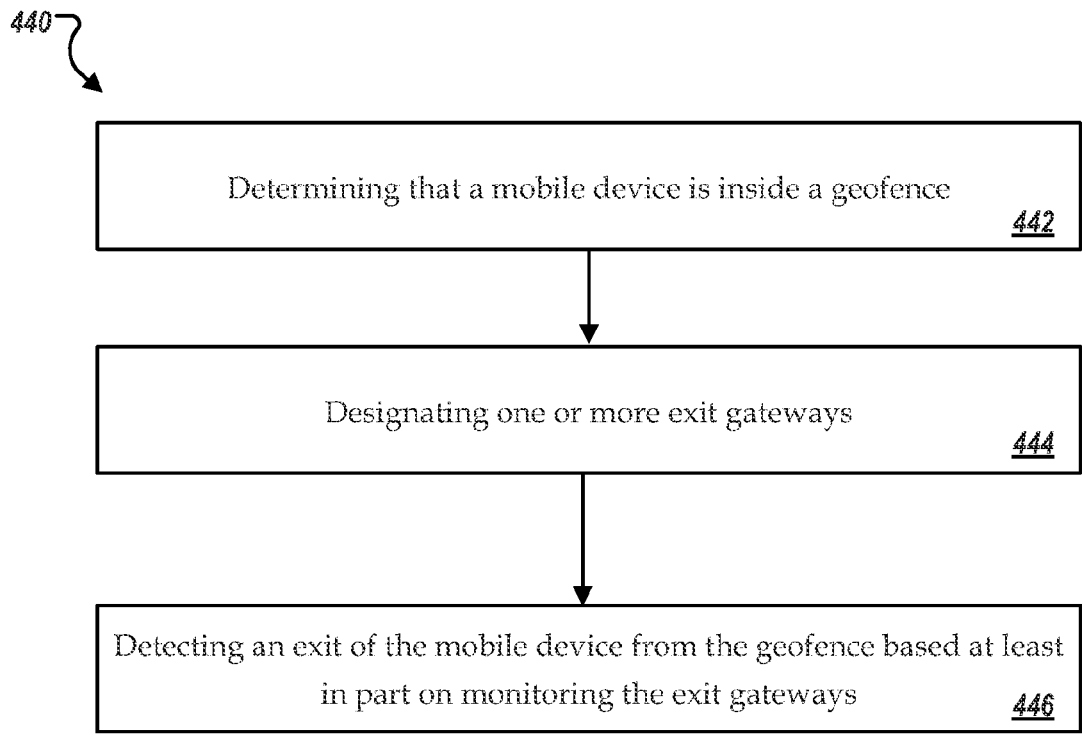

FIG. 4C is a flowchart illustrating exemplary operations 440 of monitoring a geofence exit. The operations can be performed by mobile device 100 as described above in reference to the previous figures. Mobile device 100 can determine (442), using an application processor of mobile device 100, that mobile device 100 is inside of a geofence. Determining that mobile device 100 is inside of the geofence can include monitoring, using a wireless processor of mobile device 100, one or more entry gateways. The one or more entry gateways can be one or more wireless access points selected for monitoring an entry into the geofence. Determining that mobile device 100 is inside of the geofence can include waking the application processor and using the application processor to determine that the mobile device entered the geofence upon detecting, by the wireless processor, at least one of the one or more entry gateways. The application processor can determine a location of mobile device 100 using various location-determination devices or programs.

Mobile device 100 can designate (444) one or more exit gateways. The exit gateways can include one or more wireless access points observable when mobile device 100 is in the geofence. Mobile device 100 can use the exit gateways to monitor an exit from the geofence.

Mobile device 100 can detect (446) an exit from the geofence based at least in part on monitoring the exit gateways. Detecting the exit can include monitoring, using the wireless processor, a combined collection of wireless access points including the one or more entry gateways and the one or more exit gateways. Mobile device 100 can determine that, for at least a threshold number of scans by the wireless processor, none of the combined collection of wireless access points is observable by the wireless processor. Then, mobile device 100 can wake the application processor of the mobile device to determine whether the mobile device exited the geofence.

Figure 4D:
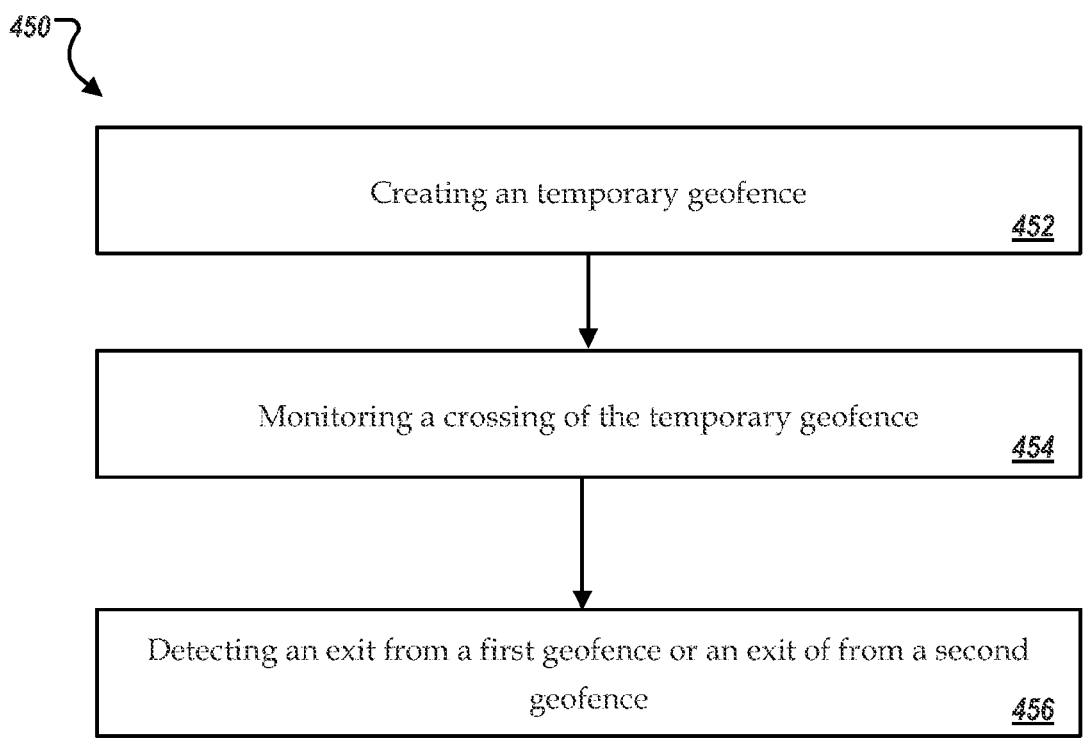

FIG. 4D is a flowchart illustrating exemplary operations 450 of monitoring a geofence exit when a mobile device is in multiple geofences. The operations can be performed by mobile device 100 as described above in reference to the previous figures.

Mobile device 100 can determine that mobile device 100 is located in multiple geofences, for example, a first geofence and a second geofence. The first geofence can intersect the second geofence. Upon determining that mobile device 100 is located in both geofences, mobile device 100 can create (452) a temporary geofence around a current location of mobile device 100. Creating the temporary geofence can include defining the temporary geofence using a fence location and a fence dimension. The fence location can be a current location of mobile device 100. The current location can be determined by an application processor of mobile device 100. The fence dimension can be a specified value (e.g., 100 meters). In some implementations, the fence dimension can be determined based on the sizes of the first geofence and second geofence.

Mobile device 100 can identify one or more common gateways for monitoring the temporary geofence. The common gateways can include one or more wireless access points that are observable by mobile device 100 when mobile device 100 is in the first geofence and the second geofence.

Mobile device 100 can monitor (454) an exit of the temporary geofence. Monitoring the exit of the temporary geofence can include scanning signals from the identified common gateways using a wireless processor.

Mobile device 100 can detect (456) whether the mobile device is inside of the first geofence and whether the mobile device is inside of the second geofence upon detecting the exit from the temporary geofence. Upon detecting the exit from the temporary geofence, mobile device 100 can wake an application processor of mobile device 100 to determine whether mobile device 100 exited from the first geofence or whether mobile device 100 exited from the second geofence. Detecting the exit from the temporary geofence can include determining, using the wireless processor of mobile device 100, that the common gateways are unobservable in a threshold number of consecutive scans.

Exemplary User Interface of a Geofence Detection System

Figure 5:
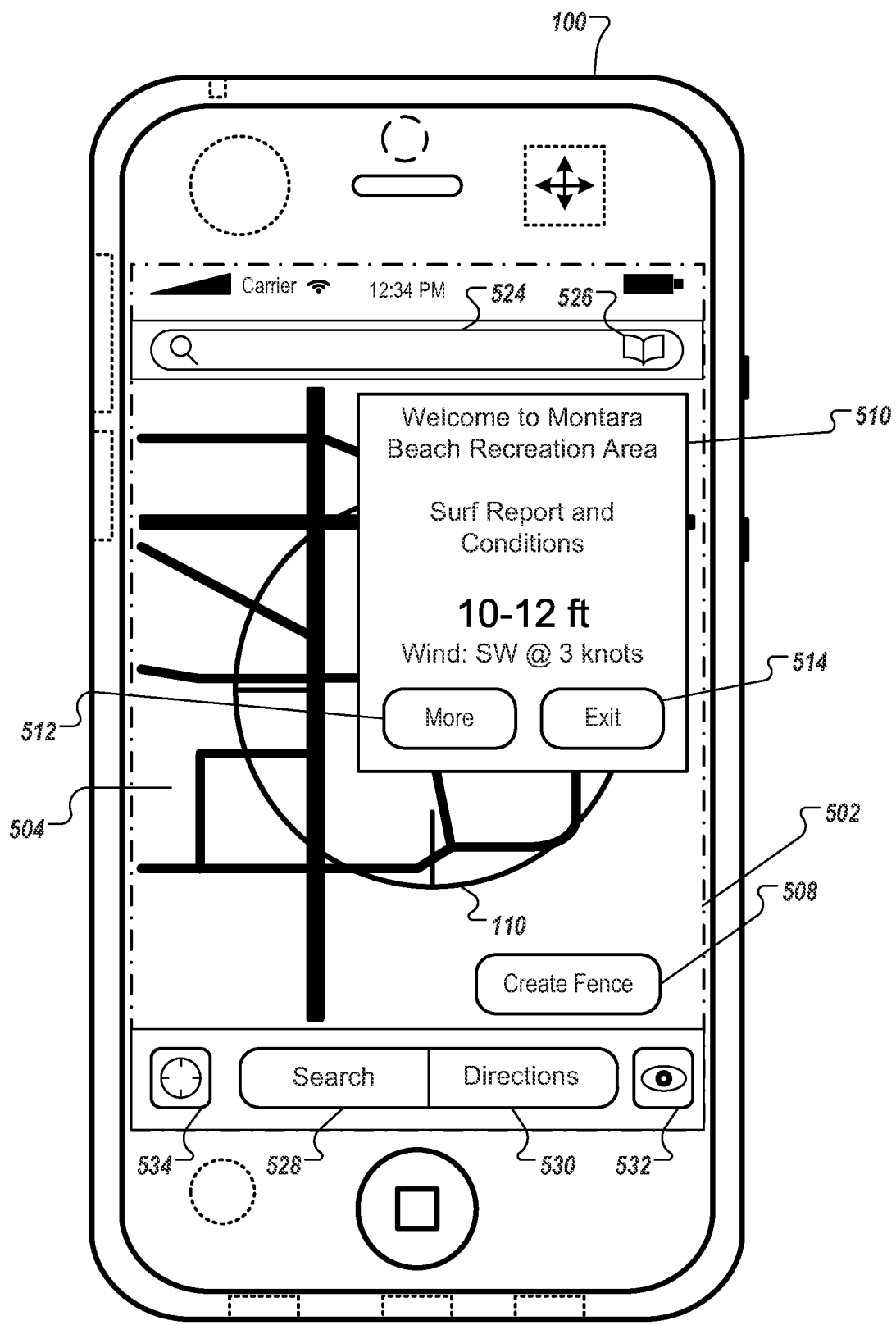
FIG. 5 is a diagram illustrating an exemplary user interface of a mobile device using a geofence-based service.

FIG. 5 is a diagram illustrating an exemplary user interface of a mobile device using a geofence-based service. The mobile device can be mobile device 100 as described above. Mobile device 100 can allow a user to create geofence 110 using the user interface. Mobile device 100 can be, for example, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, mobile device 100 can include touch sensitive screen 502. Mobile device 100 can provide map 504 for display on touch sensitive screen 502. Mobile device 100 can receive a touch input on map 504. Based on a location of the touch input on map 504, mobile device 100 can create geofence 110 when mobile device 100 receives an input (e.g., a tap on "Create Fence" button 508). Geofence 110 can have a location (e.g., a center) that corresponds to the location of the touch input on map 504. Upon creation of the geofence, mobile device 100 can select, from multiple wireless access points, one or more wireless access points for monitoring geofence 110.

Mobile device 100 can associate a task with geofence 110. For example, mobile device 100 can receive a user input to associate an application program with geofence 110. In the example shown, geofence 110 can correspond to a beach area. The application program can be an application that retrieves information related to surf condition at the beach area.

Mobile device 100 can invoke the application program when mobile device 100 enters geofence 110. If mobile device 100 detects at least one of the selected wireless access points, mobile device 100 can use various location determination operations to determine that mobile device 100 entered geofence 110. Upon determination that mobile device 100 entered geofence 110, mobile device 100 can provide for display interface 510 of the application program. Interface 510 can include, for example, text information relating to surf condition associated with the geofence, and controls 512 and 514 for navigating through pages of the text information.

A search bar 524 and a bookmarks list object 526 can be displayed at the top of interface 510. Below the bottom of interface 510 one or more display objects can be displayed, for example a search object 528, a directions object 530, a map view object 532, and a current location object 534.

Search bar 524 can be used to find an address or other location on the map. For example, a user can enter a home address in search bar 524. Bookmarks list object 526 can, for example, display a Bookmarks list that contains addresses that are frequently visited, such as the user's home address.

The Bookmarks list can also, for example, contain special bookmarks such as bookmarked locations of mobile device 100.

Search object 528 can be used to display search bar 524 and other map related search menus. Directions object 530 can, for example, display a menu interface that allows the user to enter a start and end location. The interface can then display information (e.g., directions and travel time for a route from the start location to the end location). Map view object 532 can display a menu that can allow the user to select display options for a crowdware application program. Current location object 534 can allow the user to see a geographic region on map 504 indicating where mobile device 100 is currently located.

Exemplary Access Point Selection Techniques

Figure 6:
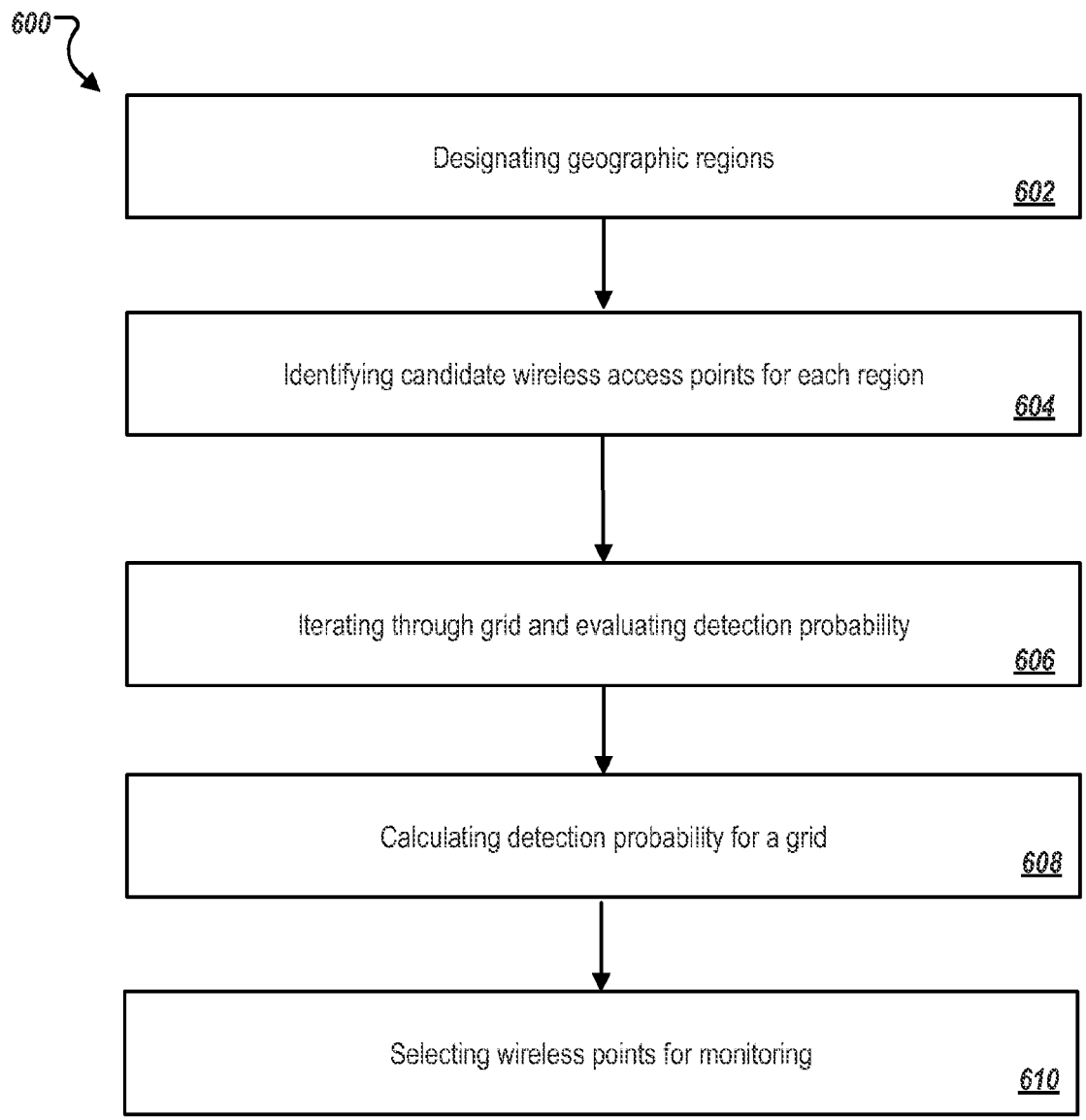
FIG. 6 is a flowchart illustrating an exemplary process of selecting wireless access points for monitoring a geofence.

FIG. 6 is a flowchart illustrating exemplary process 600 for selecting wireless access points for monitoring a geofence. Process 600 can be performed by mobile device 100 (as described above).

Upon receiving geofence 110 (as described above in reference to FIGS. 1 and 5), mobile device 100 can designate (602) multiple geographic regions to correspond to geofence 110. Mobile device 100 can select wireless access points for monitoring geofence 110 based on the geographic regions. Further details of designating the geographic regions will be described below in reference to FIG. 7.

Mobile device 100 can identify (604) candidate wireless access points for monitoring in each of the geographic regions. Further details of identifying candidate wireless access points for monitoring in each of the geographic regions will be described below in reference to FIGS. 8A-8B and 9A-9B.

Mobile device 100 can iterate through the geographic regions and evaluate (606) a detection probability for each region. The detection probability of a region can indicate a probability that a mobile device 100, if located in the region, can detect a wireless access point selected for monitoring, and thus detecting a potential entry into geofence 110. The detection probability of a region can be measured using a probing point detection probability. Further details of evaluating the probing point detection probability will be described below in reference to FIG. 10.

Based on the detection probability of the regions, mobile device 100 can calculate (608) a detection probability for the regions as a whole. The detection probability for the regions as a whole can indicate a likelihood that mobile device 100 can determine a potential entry into geofence 110 using the set of the candidate wireless access points. This probability can be measured using a value designated as a grid detection probability. Further details of calculating and applying the grid detection probability will be described below in reference to FIG. 10. Based on the grid detection probability, mobile device 100 can select (610) one or more wireless access points for monitoring geofence 110 or other geofences or both.

Figure 7:
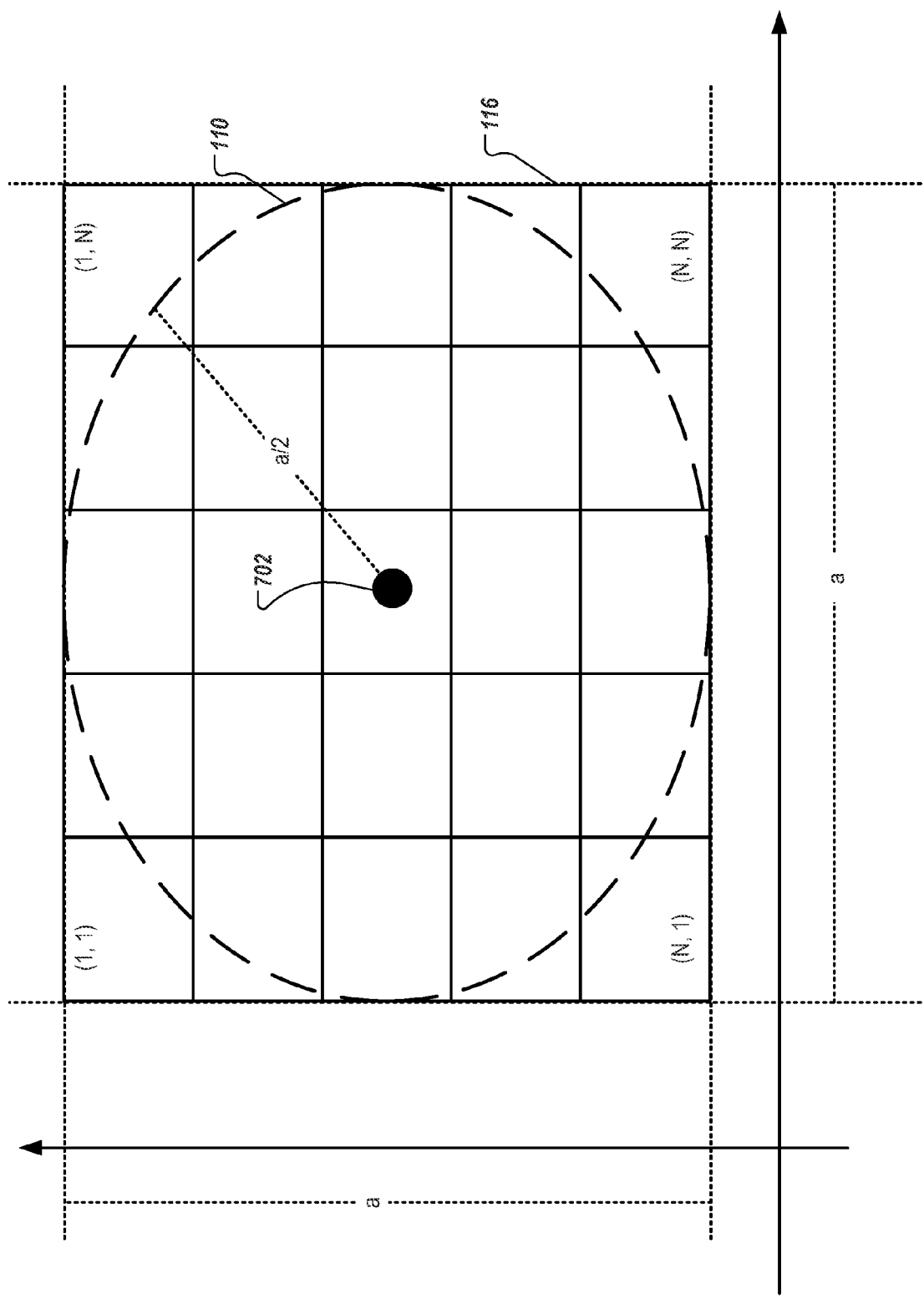
FIG. 7 is a diagram illustrating exemplary techniques for selecting wireless access points for monitoring using a geographic grid.

FIG. 7 is a diagram illustrating exemplary techniques for selecting wireless access points for monitoring using a geographic grid. Mobile device 100 (as described above) can perform the operations of selecting the wireless access points.

Mobile device 100 can receive geofence 110 from a user (e.g., as described in reference to FIG. 5). Upon receiving geofence 110, mobile device 100 can designate multiple geographic regions to correspond to geofence 110. For example, mobile device 100 can create virtual geographic grid 116 that corresponds to geofence 110. Mobile device 100 can select wireless access points based on virtual geographic grid 116.

Geographic grid 116 can include N×N equally distributed tiles. Each tile can be a substantially rectangular area. Each tile can have a same size. For example, geographic grid 116 can include 25 square tiles. Mobile device 100 can determine the total number of tiles ($N^2$) in grid 116 based on a scanning capacity of a wireless processor of mobile device 100. Specifically, the number of tiles can be determined using the following formula:

$$N^2 = (\text{floor}(\sqrt{MAX\_EL}))^2, \quad (1)$$

where $N^2$ is the total number of tiles, MAX_EL is a maximum number of elements, which can correspond to the total number of wireless access points a wireless processor can monitor (e.g., 150).

When geofence 110 is a units wide and a units long, each tile can have a size of $(a/N)^2$. Geofence 110 can be served by MAX_AP number of wireless access points. In this example, geofence 110 is a substantially circular area having center 702. Center 702 can be associated with a latitude and a longitude. Geofence 110 can have a radius a/2. In various implementations, the geographic regions can have other shapes and varying sizes. Mobile device 100 can select wireless access points for monitoring geofence 110 based on a total number of wireless access points to scan, and a maximum number of wireless access points to scan in each of the geographic regions. This maximum number will be referred to as a wireless access point allowance, as described in further details below in reference to FIGS. 8A and 8B.

Per-Region Limitations in Selecting Wireless Access Points

Figures 8A, 8B:
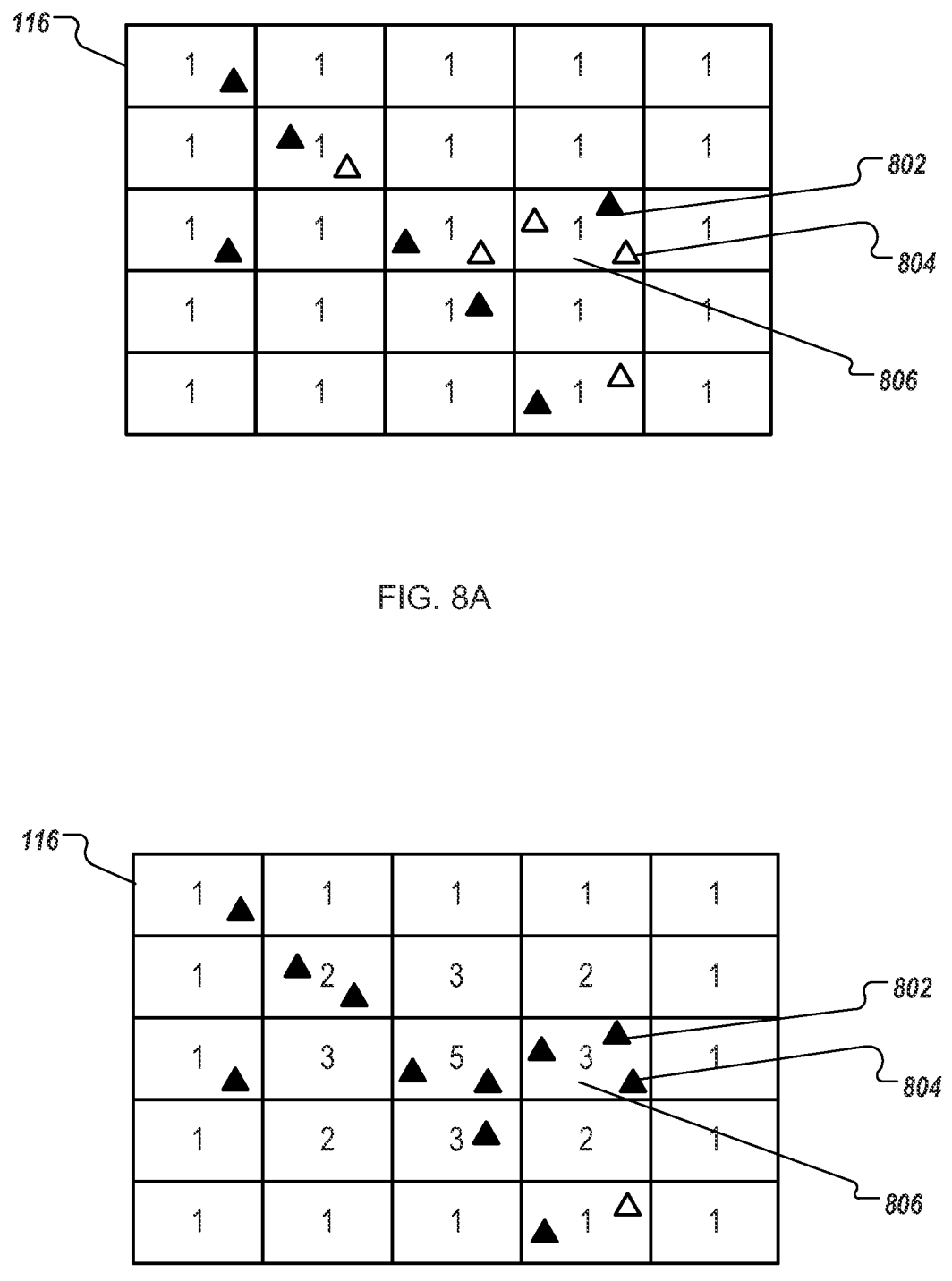

FIGS. 8A and 8B are diagrams illustrating exemplary wireless access point allowances used in selecting wireless access points. A wireless access point allowance can be a value associated with a tile in geographic grid 116. The value can indicate a maximum number of wireless access points located in the tile that can be selected. FIG. 8A illustrates an allowance setting where wireless access point allowance is set to "1" for each tile. The allowances are shown as numbers in the tiles. In this setting, at most one wireless access point can be selected in each tile. If, for example, wireless access points 802 and 804 are both located in tile 806 of geographic grid 116, at most one of wireless access points 802 and 804 can be selected for monitoring a geofence. A selected wireless access point is represented using a black triangle; an unselected one, a white triangle.

FIG. 8B illustrates an allowance setting where different wireless access point allowances are associated with different tiles. In some implementations, the wireless access point allowance for tile 806 is set to three. Accordingly, both wireless access points 802 and 804 can be selected. Not all tiles are equal. Some tiles may have greater wireless access point allowance than others. For example, tiles located at or near a center of geographic grid 116 can have higher wireless access point allowances than tiles located at the edge do.

Figure 9A:
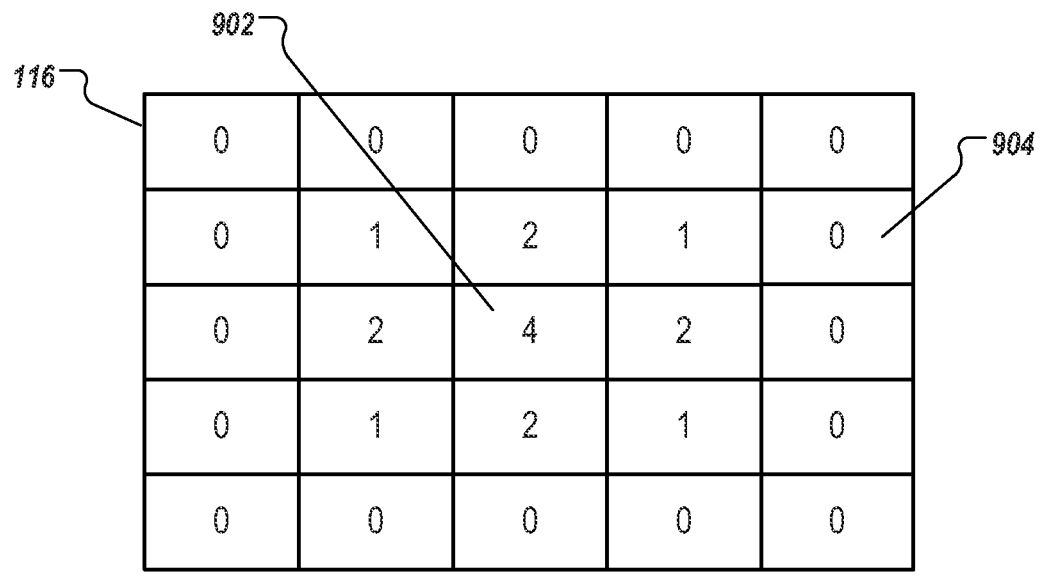
FIGS. 9A and 9B are diagrams illustrating exemplary stages of assigning wireless access point allowances to a geographic grid.
Figure 9B:
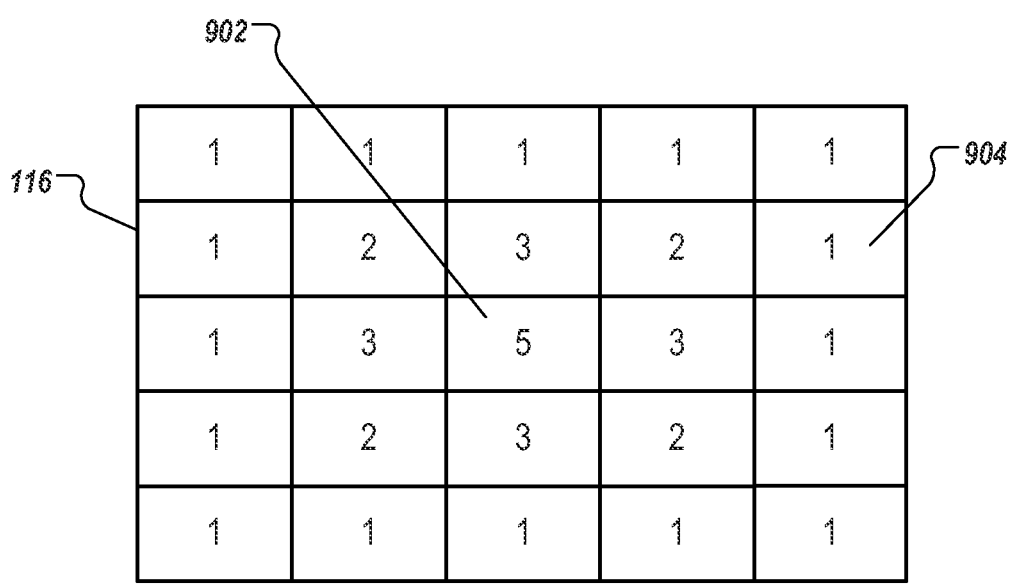

FIGS. 9A and 9B are diagrams illustrating exemplary stages of assigning wireless access point allowances to a geographic grid. Selecting wireless access points can include identifying sets of candidate wireless access points in multiple iterations. In each iteration, a set of candidate wireless access points can be identified. In each iteration, one or more wireless access point allowances can be increased. FIG. 9A shows exemplary wireless access point allowances assigned in an iteration (e.g., an initial iteration). A wireless access point allowance associated with center tile 902 can have a higher value than a wireless access point allowance associated with edge tile 904. FIG. 9B shows exemplary wireless access point allowances assigned in a subsequent iteration. The wireless access point allowances assigned in previous iterations can be increased.

Figure 9C:
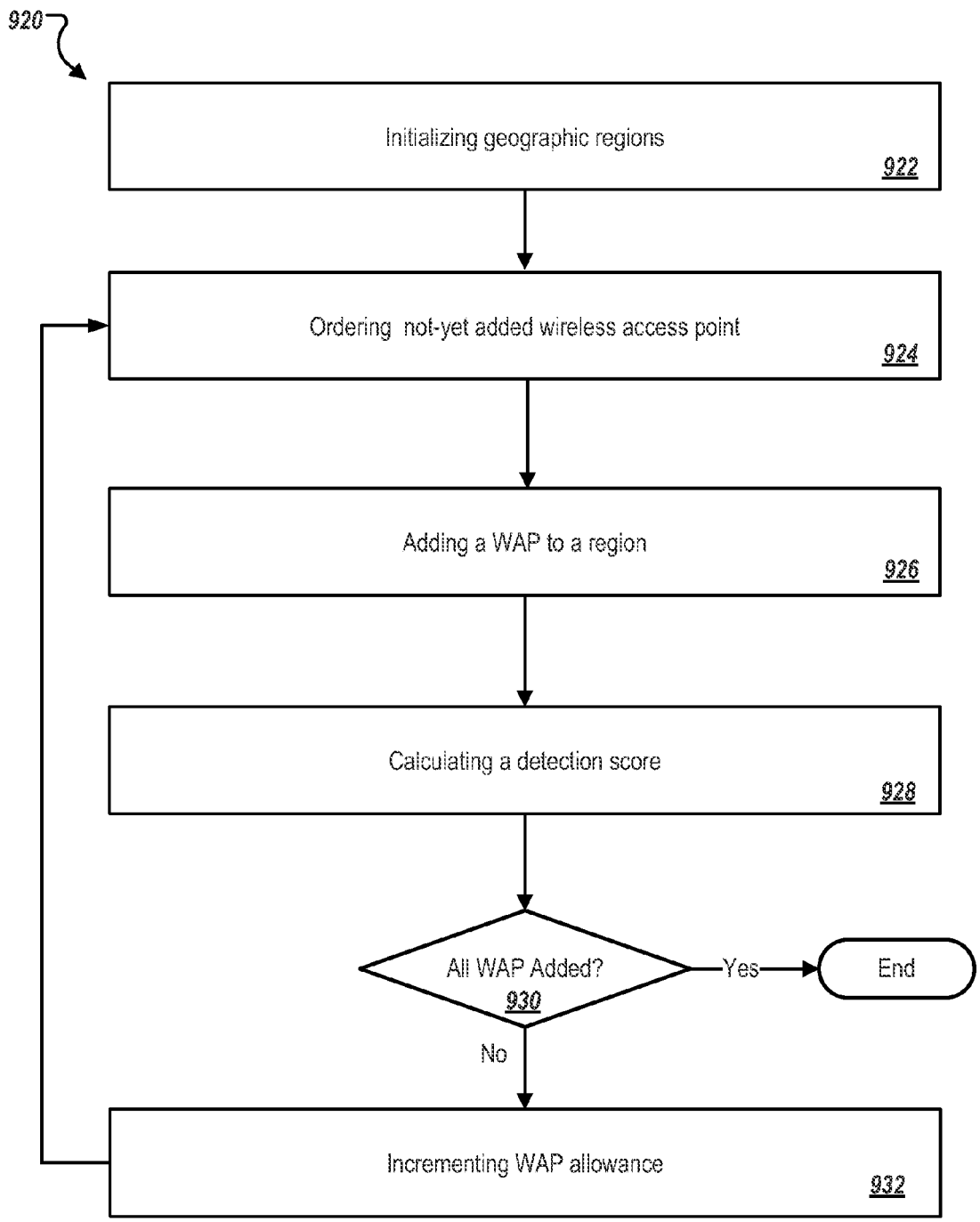
FIG. 9C is a flowchart illustrating an exemplary process of identifying candidate wireless access points based on geographic regions.

FIG. 9C is a flowchart illustrating exemplary process 920 of identifying candidate wireless access points based on geographic regions. Process 920 can be performed by a mobile device such as mobile device 100 as described above. The geographic regions can be tiles in a geographic grid corresponding to a geofence. Mobile device 100 can add wireless access points to geographic regions in multiple iterations, and designate the wireless access points added in an iteration and its prior iterations as a set of candidate wireless access points.

Mobile device 100 can initialize (922) the geographic regions. Initializing the geographic regions can include assigning a wireless access point allowance to each of the geographic regions in a setting as described above in reference to FIG. 9A.

Mobile device 100 can order (924) the not-yet-added wireless access points by an access point score (AP score) associated with each wireless access point. The AP score of a wireless access point is a value that can indicate an importance of the wireless access point. The AP score of the wireless access point can be determined by (a) a number of observations of the wireless access point, which can be a number of times various mobile devices detected or communicated with the wireless access point in the past; or (b) a time of observation, where an observation closer to present time can correspond to a higher score; or (c) a combination of (a) and (b).

Mobile device 100 can add (926) the not-yet-added wireless access points to the geographic regions based on AP scores and the wireless access point allowance of each geographic region. For example, if (a) a wireless access point having a high AP score is associated with a region (based on a location of the wireless access point), and (b) a number of selected access points in the region has not reached the wireless access point allowance, then, mobile device 100 can add the wireless access point to the region. In some implementations, adding the not-yet-added wireless access points to the geographic regions can include selecting the wireless access points to be added based on channel optimization in addition to the AP scores. Channel optimization will be described in further details below in reference to FIG. 9D.

Mobile device 100 can calculate (928) a grid detection probability for wireless access points already added. Each set of candidate wireless access points can be associated with a grid detection probability. The grid detection probability can indicate the probability of detecting the geofence by monitoring the candidate wireless access points in the set (e.g., the already added wireless access points). The grid detection probability can be used to balance accuracy (the more wireless access points to monitor, the likelier the detection) and efficiency (the more wireless access points to monitor, the higher the power consumption), and to balance whether to use limited scan capacity of a wireless processor (e.g., 150 access points at one time) to monitor this or another geofence. Further details on calculating the grid detection probability will be described below in reference to FIG. 10.

Mobile device 100 can determine (930) whether all wireless access points geographically corresponding to the grid are added. Determining whether all wireless access points geographically corresponding to the grid are added can include performing a search in a wireless access point list using the location of the grid as an index. If all are added, process 920 can terminate.

If there are more wireless access points, mobile device 100 can increment (932) wireless access point allowances for the geographic regions. For example, mobile device 100 can increment the wireless access point allowances according to FIG. 9B. After the incrementing operations, mobile device 100 can iterate the operations by returning to stage 924.

Channel Optimization

FIG. 9D is exemplary histogram 960 illustrating techniques of identifying candidate wireless access points based on channel optimization. Channel optimization can be performed by a mobile device such as mobile device 100 as described above.

Mobile device 100 can use a wireless processor to monitor the selected wireless access points for a geofence. The wireless processor can scan multiple channels for signals from the wireless access points. The wireless processor often consumes more power when more channels are scanned. Mobile device 100 can reduce the number of channels scanned by selecting as many wireless access points that operate in the same channels as possible, when other conditions are equal.

Mobile device 100 can store a list of wireless access points. Each of the wireless access points can be associated with a channel in which the wireless access point operates. Mobile device 100 can generated histogram 960 on all wireless channels (e.g., channel 1 through channel 11) using a probability density function. Each channel can be assigned a channel score based on the probability density function for a given geofence or for a given group of geofences. The probability density function can indicate a likelihood that a wireless access point operates in a particular channel. In some implementations, the channel score of a channel can be determined based on a number of wireless access points using this channel.

In some implementations, mobile device 100 can use the probability density function to identify the most common access points for a given group of fences. Mobile device 100 can select these access points for monitoring the group of geofences. The selection can improve a likelihood of observing a wireless access point by mobile device 100. In some implementations, mobile device 100 can identify one or more popular channels. For example, mobile device 100 can select top X (e.g., three or four) most populate channels. In some implementations, mobile device 100 can specify selection threshold 962. Mobile device 100 can designate the wireless channels whose channel scores satisfy the selection threshold 962 as the popular channels.

Mobile device 100 can make wireless access points operating in the popular channels more likely to be selected. In some implementations, mobile device 100 can increase the AP score of a wireless access point operating in a popular channel. In some implementations, mobile device 100 can select the wireless access points from wireless access points operating the popular channels. Accordingly, when monitoring a geofence, a wireless processor of mobile device 100 may, for example, scan three or four channels rather than all channels.

Evaluating Selected Wireless Access Points

Figure 10:
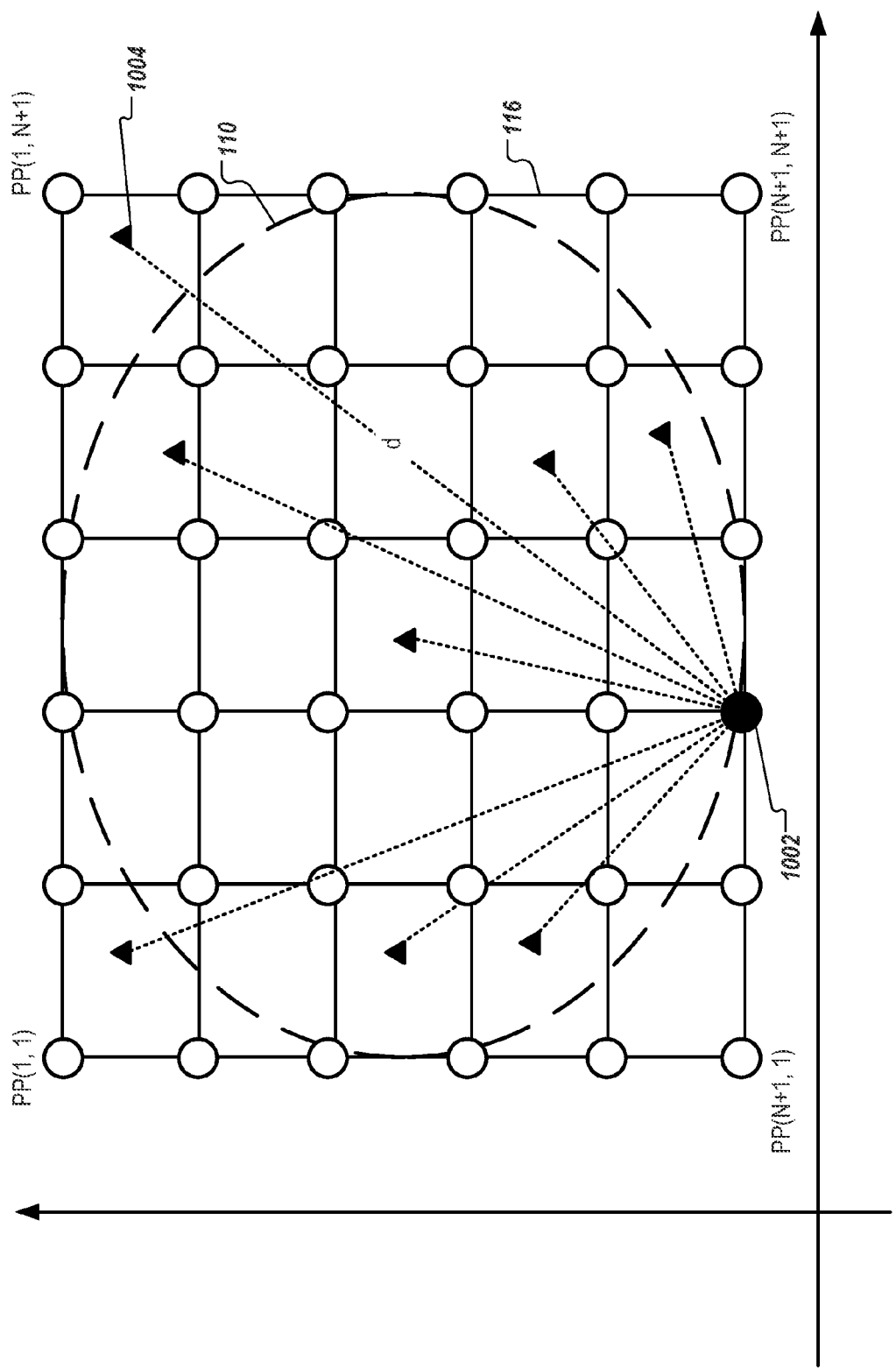
FIG. 10 is a diagram illustrating exemplary techniques for evaluating a set of candidate wireless access points.

FIG. 10 is a diagram illustrating exemplary techniques for evaluating a set of candidate wireless access points. The techniques can be implemented on a mobile device such as mobile device 100 as described above.

Mobile device 100 can evaluate multiple sets of candidate wireless access points, and determine which set of candidate wireless access points is finally selected for monitoring geofence 110. Each set of candidate wireless access points be a set of wireless access points added in an iteration (I) and the iteration's prior iterations (1, . . . I−1) of process 920 as described above in reference to FIG. 9C. To evaluate each set of candidate wireless access points, mobile device 100 can determine a grid detection probability for each set.

Mobile device 100 can determine the grid detection probability using multiple probing points. Mobile device 100 can designate at least one probing point (e.g., probing point 1002) for each geographic region. A probing point (PP) is a virtual point from which a probability of detecting at least one of the already-added wireless access points can be calculated. The probability will be referred to as a probing point detection probability. Mobile device 100 can determine the grid detection probability based on the probing point detection probability of each probing point.

To calculate a probing point detection probability for probing point 1002, mobile device 100 can model signal propagation of a wireless access point using path loss calculation below.

$$P_k = -10\beta \log_{10}(d) + P_0 + \eta, \quad (2)$$

where $P_k$ is a signal strength at a point that is at distance d away from the wireless access point (e.g., wireless access point 1004), $P_0$ is a signal strength at the wireless access point, $\eta$ is a constant which accounts for system losses, and $\beta$ is path loss exponent. The path loss exponent can reflect an environment of the signal propagation. For example, outdoors, in free space, $\beta$ can have a value of two; in shadowed urban area, $\beta$ can have a value between 2.7 and 5. In buildings, in line-of-sight, $\beta$ can have a value between 1.6 and 1.8; when obstructions exist, $\beta$ can have a value between 4 and 6. A potential detection range of a wireless access point can be determined when a signal strength ratio $P_k/P_0$ is in the range from −30 dB to −113 dB.

According to formula (2), detectability of a wireless access point can be subject to variations such as indoor/outdoor propagation, wireless transmission power, among others. Mobile device 100 can base the calculation of a probing point detection probability on a lower bound detection distance, which can be defined using the following calculation:

$$Z = \frac{\|\theta_u - \theta_0\|}{\sigma_{\theta u}}, \quad (3)$$

where Z is the lower bound detection distance, $\theta_u$ is a potential user location, $\theta_0$ is an estimated location of the wireless access point (which can be determined using an independent process by a server), and $\sigma_{\theta u}$ is an estimated lower bound signal propagation.

Mobile device 100 can then determine a probability of probing point PP detecting a wireless access point by integrating over the lower bound detection distance using the following calculation:

$$P_{D_{PP \to SAP_n}} = \frac{2}{\pi} \int_Z^\infty e^{-t^2} dt, \quad (4)$$

where $P_{D_{PP \to SAP_n}}$ is a probability of probing point PP detecting an nth selected wireless access point SAPn (e.g., wireless access point 1004); Z is the lower bound detection distance, and t is a distance over which the probing point detection probability is integrated.

Mobile device 100 can determine a probing point detection probability based on the probabilities that a probing point detects, or does not detect, wireless access points already added, using the following calculations:

$$P_D(PP_k) = \quad (5)$$
$$1 - (1 - P_{D_{PP_k \to SAP_1}})(1 - P_{D_{PP_k \to SAP_2}}) \cdots (1 - P_{D_{PP_k \to SAP_n}}),$$

where $P_D(PP_k)$ is a probing point detection probability for the kth probing point PPk (e.g., probing point 1002).

Mobile device 100 can determine the grid detection probability for a set of candidate wireless access points based on the probing point detection probability for each probing point. The grid detection probability can be an average of the probing point detection probabilities for all probing points, or a minimum probing point detection probability among all probing points.

Selecting Access Points from Candidates

Figure 11:
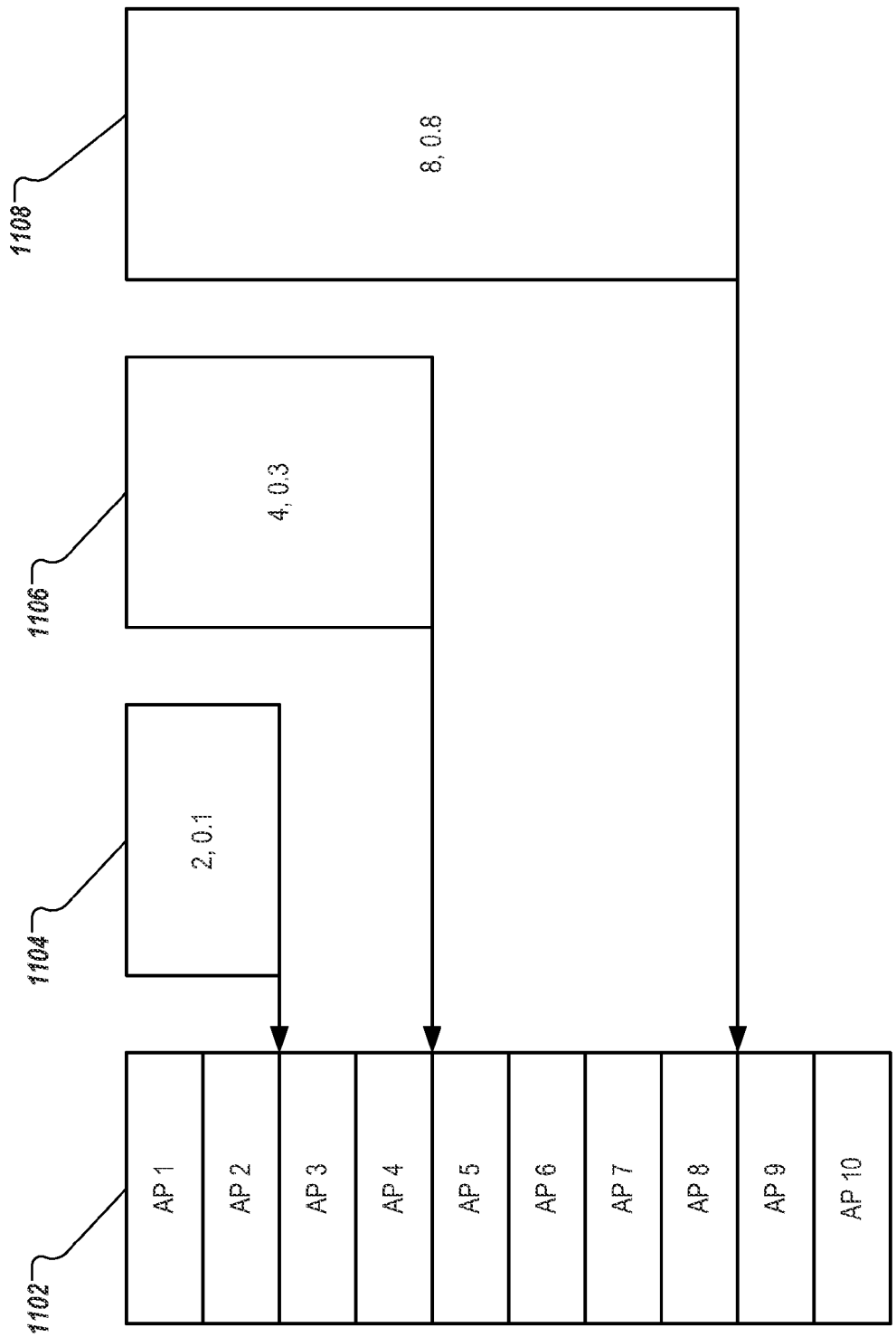
FIG. 11 is a diagram illustrating exemplary techniques of selecting wireless access points for monitoring a geofence from sets of candidate wireless access points.

FIG. 11 is a diagram illustrating exemplary techniques of selecting wireless access points for a monitoring geofence from sets of candidate wireless access points. The techniques can be implemented on a mobile device, such as mobile device 100 as described above. Mobile device 100 can store identifiers of a set of wireless access points 1102 that are located sufficiently close to a geofence such that the wireless access points 1102 can potentially be used to monitor the geofence.

Using the operations described above (e.g., in reference to FIGS. 8A-10), mobile device 100 can identify sets of candidate wireless access points 1104, 1106, and 1108. Each set of candidate wireless access points 1104, 1106, or 1108 can include one or more wireless access points from the set of wireless access points 1102. Each set of candidate wireless access points 1104, 1106, or 1108 can correspond to a detection probability (e.g., a grid detection probability as described above in reference to FIG. 10). For example, set 1104, including wireless access points AP1 and AP2, can be associated with a grid detection probability 0.1; set 1106, including wireless access points AP1 through AP4, can be associated with a grid detection probability 0.3; set 1108, including wireless access points AP1 through AP8, can be associated with a grid detection probability 0.8.

In some implementations, mobile device 100 can select the set of candidate wireless access points to monitor a geofence based on improvement of detection probability over selecting another set of candidate wireless access points. For example, mobile device 100 can select a set (e.g., set 1108) that provides most improvement in detection probability per additional wireless access point added.

Figure 12:
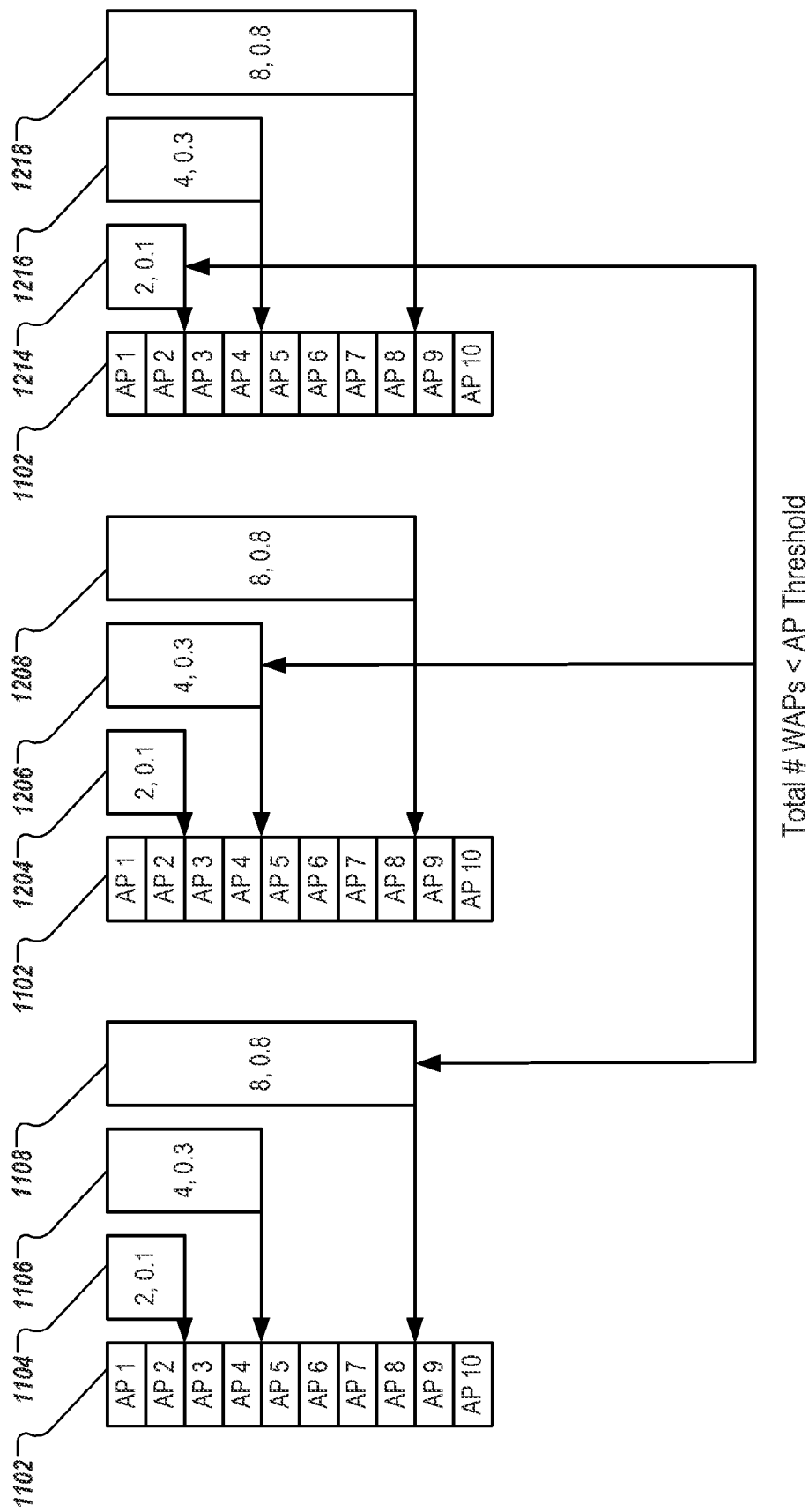
FIG. 12 is a diagram illustrating exemplary techniques of selecting wireless access points for multiple geofences from sets of candidate wireless access points.

FIG. 12 is a diagram illustrating exemplary techniques of selecting wireless access points for multiple geofences from sets of candidate wireless access points. A mobile device, such as mobile device 100 as described above, can monitor multiple geofences. Monitoring multiple geofences can include scanning for signals from multiple wireless access points designated for monitoring each geofence.

For example, mobile device 100 can be configured to monitor a first, a second, and a third geofence. Using the operations described above (e.g., in reference to FIGS. 8A-11), mobile device 100 can identify sets of candidate wireless access points 1104, 1106, and 1108 for monitoring the first geofence. Mobile device 100 can identify sets of candidate wireless access points 1204, 1206, and 1208 for monitoring the second geofence. Mobile device 100 can identify sets of candidate wireless access points 1214, 1216, and 1218 for monitoring the third geofence. When selecting wireless access points to monitor, mobile device 100 can ensure that the total number of wireless access points to monitor the first, second, and third geofences satisfy (e.g., do not exceed) an access point threshold. The access point threshold can be determined based on a configuration of a wireless processor (e.g., a maximum scan capacity of a WiFi™ chip) of mobile device 100. Further details of selecting wireless access points that satisfy the access point threshold will be described below in reference to FIG. 13A.

Figure 13A:
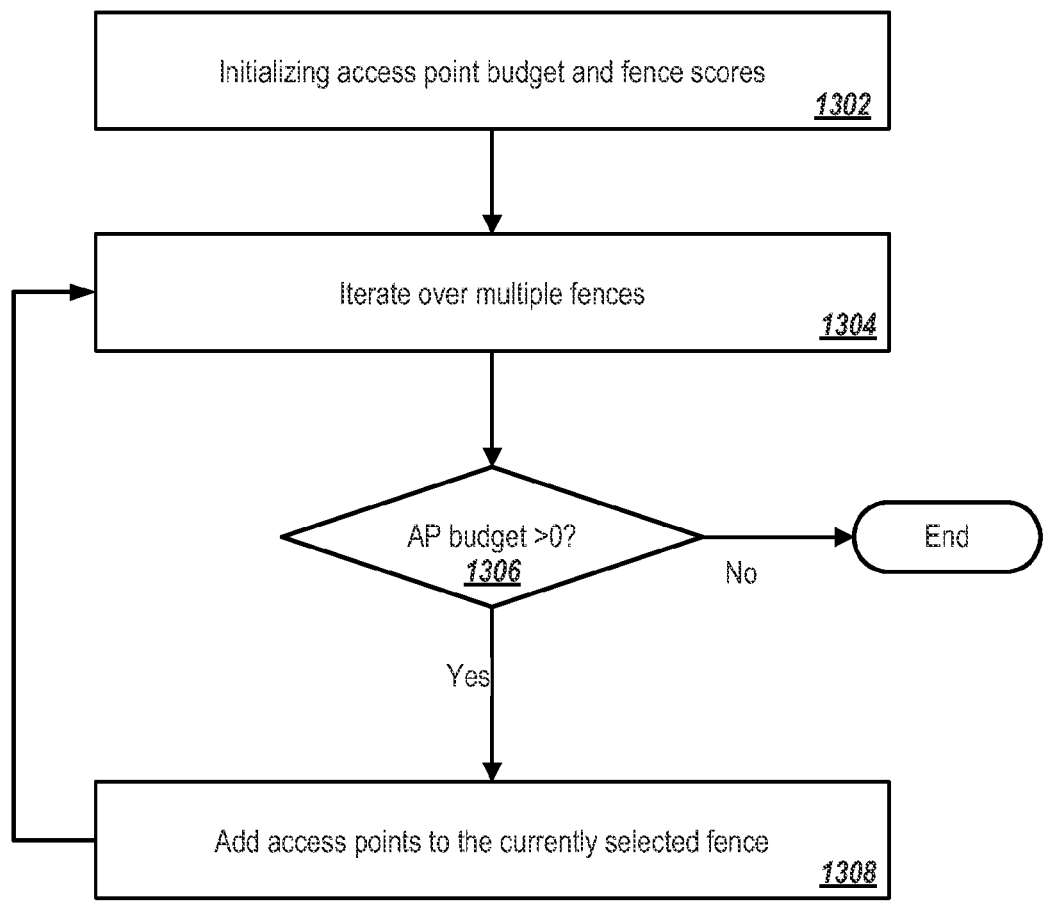
FIG. 13A is a flowchart illustrating exemplary operations for selecting wireless access points for monitoring multiple geofences.

FIG. 13A is a flowchart illustrating exemplary operations 1300 for selecting wireless access points for monitoring multiple geofences. The operations can be performed by a mobile device such as mobile device 100 as described above.

Mobile device 100 can initialize (1302) an access point budget and fence scores. The access point budget can be a value indicating how many more wireless access points can be selected, for example, based on a scanning capacity of a wireless processor, and wireless access points already selected. Initializing the access point budget can include setting the access point budget to an initial value based on the scanning capacity. A fence score of a geofence can be a detection probability (e.g., a grid detection probability) determined based on wireless access points already selected for the geofence. Initializing the fence score can include setting the fence scores of all geofences being considered to zero.

Mobile device 100 can iterate (1304) through the geofences and select the wireless access points. Iterating through the geofences can include selecting wireless access points for monitoring each geofence. During the iteration, mobile device 100 can determine (1306) if the access point budget remains greater than zero. If the access point budget reaches zero, mobile device 100 can stop selecting wireless access points. Otherwise, mobile device 100 can continue the iterations.

If the access point budget remains greater than zero, mobile device 100 can add (1308) one or more wireless access points to the geofence currently being iterated upon and determine a current fence score.

Iterating (1304) through the geofences can include performing the following operations based on the geofences to be monitored. Mobile device 100 can select one or more wireless access points for geofence 110 being iterated upon when iteration conditions are satisfied. The iteration conditions can be satisfied when:

(1) The fence score of geofence 110 has room of improvement (e.g., the fence score of geofence 110 is less than a maximum fence score);

(2) A next fence score is significantly better than the current fence score. The next fence score is a detection probability of geofence 110 if the one or more wireless access points being considered are indeed selected. The next fence score is significantly better than a current fence score if the difference between the fence score and the current fence score satisfies a threshold; and (3) The access point budget is greater than zero.

Upon selecting the one or more wireless access points, mobile device 100 can assign the above-calculated next fence score as a new current fence score of the geofence being iterated upon, and decrease the access point budget by the number of wireless access points selected.

Figure 13B:
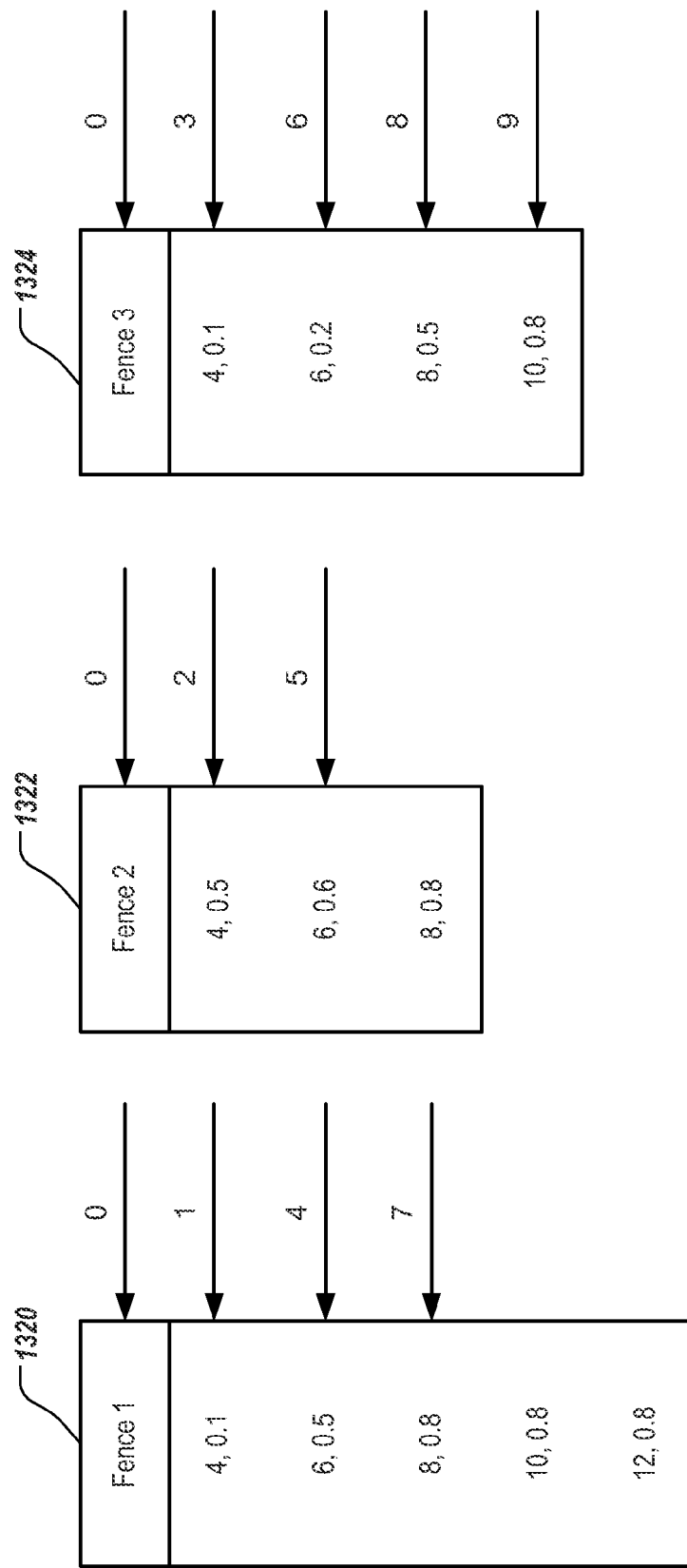
FIG. 13B illustrates an exemplary application of the operations of FIG. 13A.

FIG. 13B illustrates an exemplary application of the operations of FIG. 13A. For illustration, mobile device 100 (as described above) selects wireless access points for monitoring a first geofence (geofence 1320), a second geofence, (geofence 1322), and a third geofence (geofence 1324). Each of geofences 1320, 1322, and 1324 can be associated with multiple sets of candidate wireless access points with corresponding fence score. For example, geofence 1320 can be associated with a first set of four candidate access points, with associating fence score 0.1, a second set of six candidate access points with associating fence score 0.5, a third set of eight candidate access points with associating fence score 0.8.

During initialization operations (as indicated by arrows marked "0"), the fence scores of each of geofences 1320, 1322, and 1324 can be set to zero. After the initialization, mobile device 100 can iterate through geofences 1320, 1322, and 1324 and the sets of candidate wireless access points associated with the geofences in the order (1-9) as specified next to the arrows, until iteration conditions are no longer satisfied.

Exemplary Access Point Selection System

Figure 14:
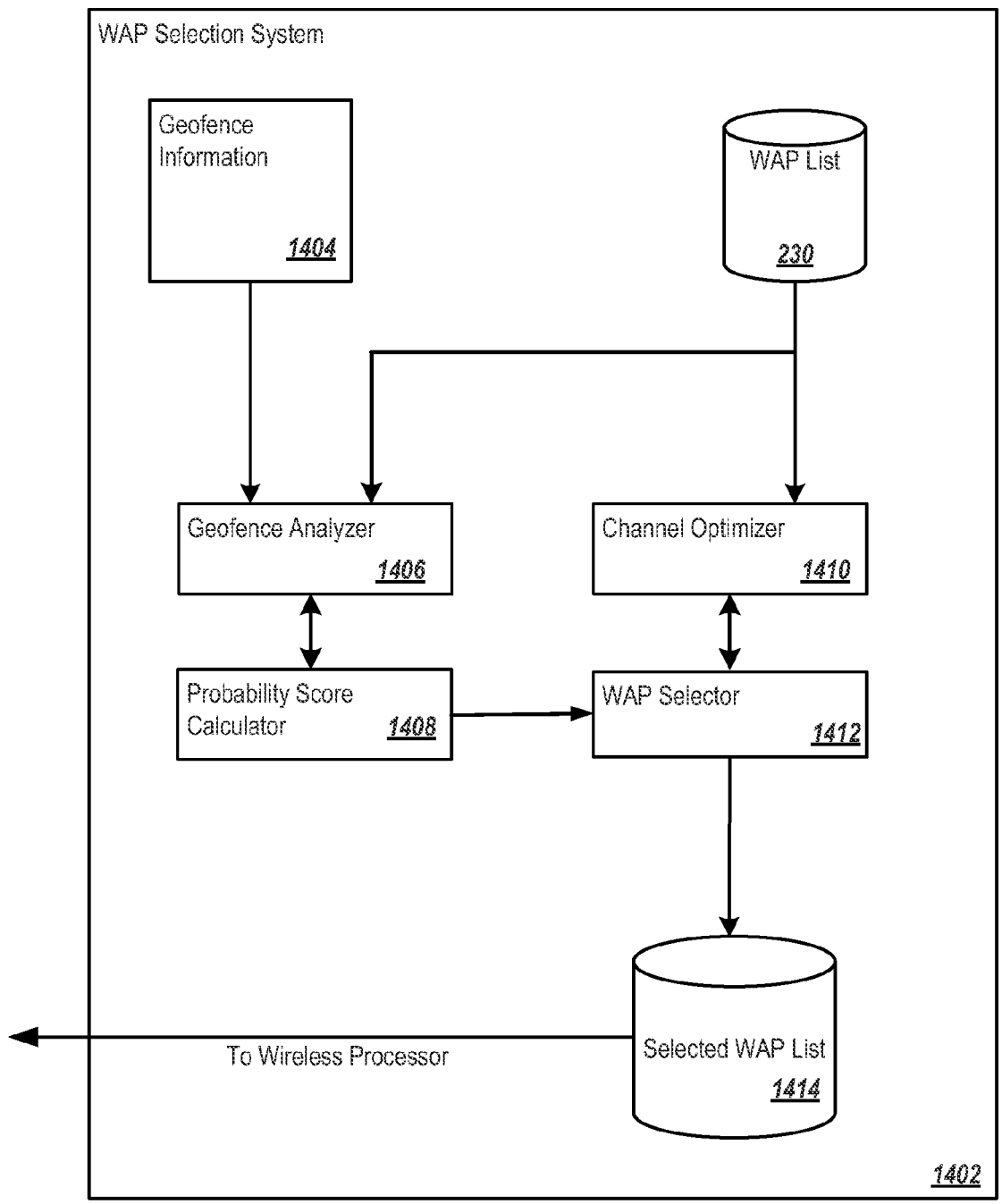
FIG. 14 is a block diagram illustrating exemplary components of a system implementing techniques of selecting wireless access points for monitoring a geofence.

FIG. 14 is a block diagram illustrating exemplary components of a system implementing techniques of selecting wireless access points for monitoring a geofence. Wireless access point selection system 1402 can be a component of a mobile device (e.g., mobile device 100 as described above) that is configured to select one or more wireless access points for monitoring a geofence.

Wireless access point selection system 1402 can include data store 230, which can store a list of wireless access points. Each wireless access point can be associated with a location, a channel, and an AP score. The location of a wireless access point can be an estimated location that may or may not correspond to a physical location of the wireless access point. The locations and AP scores can be determined by a remote server, or by mobile device 100. Data store 230 can be implemented in a database (e.g., a relational or objective database) or a flat file stored on a storage device.

Wireless access point selection system 1402 can include geofence data store 1404. Geofence data store 1404 can store information on one or more geofences, including, for example, locations and dimension of the geofences.

Wireless access point selection system 1402 can include geofence analyzer 1406. Geofence analyzer 1406 is a component of wireless access point selection system 1402 configured to create a geographic grid including one or more geographic regions (e.g., tiles). Each wireless access point in data store 230 can have a location corresponding to one of the geographic regions. Geofence analyzer 1406 can designate one or more points in each geographic region as probing points. Geofence analyzer 1406 can include hardware and software components.

Wireless access point selection system 1402 can include probability score calculator 1408. Probability score calculator 1408 is a component of wireless access point selection system 1402 configured to calculate probing point detection probabilities for each probing point, and the grid detection probability for each set of candidate wireless access points based on the probing point detection probabilities. Probability score calculator 1408 can include hardware and software components. Output from probability score calculator 1408 can be fed to geofence analyzer 1406 according to the iterative process as described above in reference to FIG. 13A.

Wireless access point selection system 1402 can include channel optimizer 1410. Channel optimizer 1410 is a component of wireless access point selection system 1402 configured to perform channel optimization operations based on channel information from data store 230. Channel optimizer 1410 can include hardware and software components.

Wireless access point selection system 1402 can include wireless access point selector 1412. Wireless access point selector 1412 is a component of wireless access point selection system 1402 configured to perform selection operations for one or more geofences based on the probabilities calculated by probability score calculator 1408 and channel information from channel optimizer 1410. Wireless access point selector 1412 can include hardware and software components.

Wireless access point selection system 1402 can include selected access point data store 1414. Selected access point data store 1414 is a component of wireless access point selection system 1402 configured to store a list of wireless access points selected by wireless access point selector 1412. Wireless access point selection system 1402 can send the selected wireless access points to a wireless processor of mobile device 100 for monitoring one or more geofences.

Exemplary Access Point Selection Operations

Figure 15:
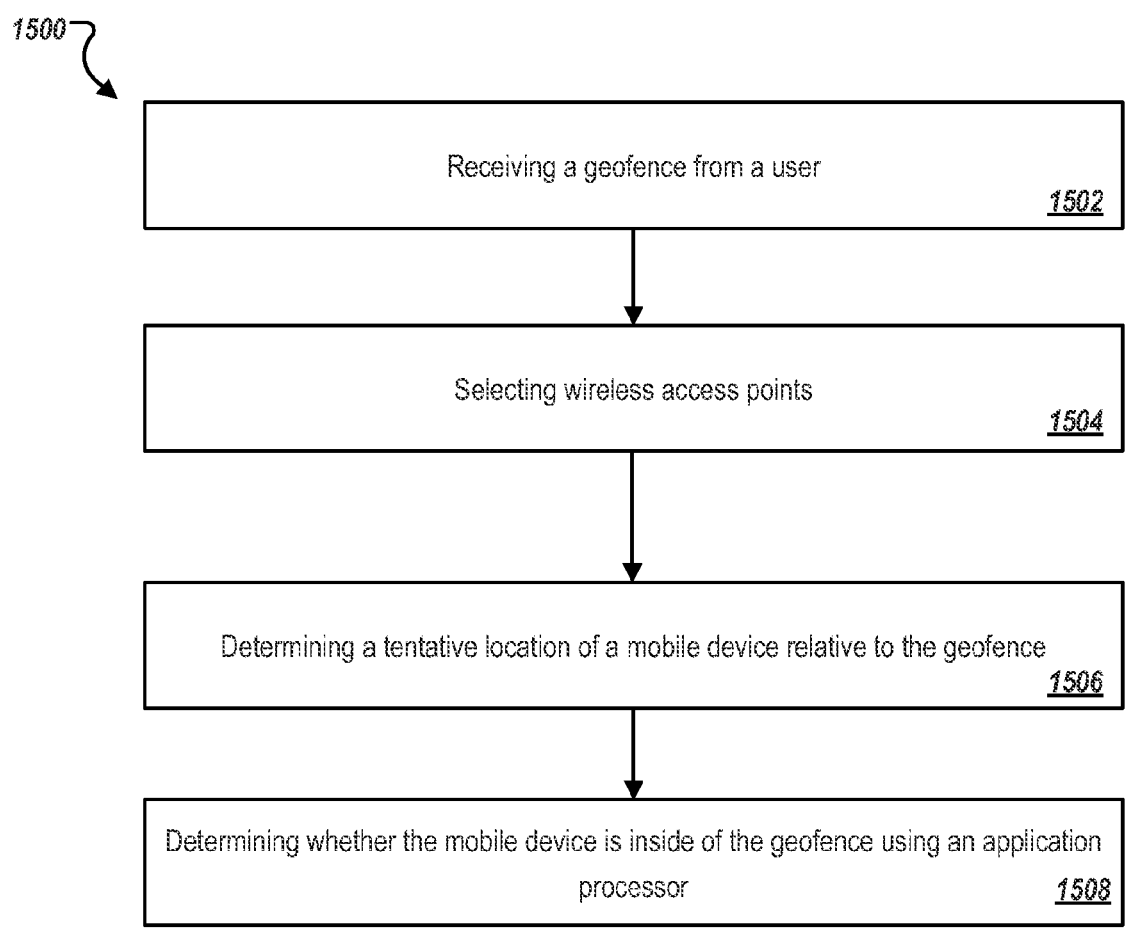
FIG. 15 is a flowchart illustrating exemplary operations of wireless access point selection.

FIG. 15 is flowchart illustrating exemplary operations 1500 of wireless access point selection. Operations 1500 can be performed by mobile device 100 as described above.

Mobile device 100 can receive (1502) a geofence. The geofence can be defined by a fence location and a fence dimension. The geofence can be received from a user Mobile device 100 can select (1504), from multiple wireless access points, one or more wireless access points for monitoring the geofence. Selecting the one or more wireless access points can include determining multiple geographic regions corresponding to the geofence, and selecting the one or more wireless access points based on a maximum total number of wireless access points to be selected and an access point allowance for each of the geographic regions. The access point allowance can indicate a maximum number of wireless access points to be selected for the geographic region. Mobile device 100 can determine the maximum number of wireless access points to be selected based at least in part on a monitoring capacity of the wireless processor.

Determining the geographic regions corresponding to the geofence can include dividing a geographic area associated with the geofence into multiple tiles. Each geographic region can correspond to a tile. Each tile can be a substantially rectangular area.

The wireless access points selected for monitoring the geofence can be stored on mobile device 100. Each wireless access point can be represented by a wireless access point identifier (e.g., a MAC address). Each wireless access point can be associated with an access point location. The access point location can be associated with (e.g., located in) one of the geographical regions for monitoring. Each wireless access point can be associated with an access point score indicating a worthiness of the wireless access point in monitoring the geofence. Each wireless access point can be associated with a channel number. The channel number can indicate on which channel a wireless access point sends and receives signals.

Selecting the one or more wireless access points can include iteratively performing scoring operations. The scoring operations can include setting or increasing the access point allowance for each of the geographic regions. The scoring operations can include ordering, based on the access point scores, wireless access points that have not yet been added to a geographic region, where the access point location associated with the not yet added wireless access point corresponds to the destination geographic region. The scoring operations can include designating already added access points as candidate wireless access points and calculating a detection probability based on the candidate wireless access point. Selecting the one or more wireless access points can include selecting the one or more wireless access points from the candidate wireless access points based on the maximum total number of wireless access points and the detection probabilities calculated in the iterative scoring operations.

Mobile device 100 can select the one or more wireless access points further based on communication channels between mobile device 100 and the wireless access points. Selecting the one or more wireless access points can include determining one or more preferred wireless access points for each of the communication channels using a probability density function, and selecting the one or more wireless access points from the preferred wireless access points. Determining one or more preferred wireless access points for each of the communication channels can include determining a popularity score of each of the communication channels using a probability density function and a number of wireless access points using the communication channel. Determining one or more preferred wireless access points for each of the communication channels can include determining the one or more preferred wireless access points based on the popularity scores of the communication channels.

Mobile device 100 can calculate the detection probability using probability calculation operations. The probability calculation operations can include designating at least one point in each of the geographic regions as a probing point. Mobile device 100 can calculate a probing point detection probability for each probing point. The probing point detection probability can indicate a likelihood that a mobile device located at the probing point can detect any chosen access point for monitoring the geofence. Mobile device 100 can calculate the detection probability based on the probing point detection probabilities of the probing points, including calculating a probability of not detecting any of the selected access points at any of the probing points using calculation (5) as described above in reference to FIG. 10.

Operations 1500 can include selecting one or more wireless access points for monitoring another geofence, such that a total number of the selected wireless access points representing the geofence and the selected wireless access points representing the other geofence does not exceeding the maximum number of wireless access points as allowable to be monitored by mobile device 100 at one time. Mobile device 100 can iteratively determine whether to select one or more candidate wireless access points for monitoring the geofence or to select the one or more candidate wireless access points for monitoring the other geofence in each iteration based on an amount of improvement that results from each selection.

Mobile device 100 can determine (1506) a tentative location of the mobile device relative to the geofence, including monitoring the selected one or more wireless access points using a wireless processor and tentatively determine, for example, whether mobile device 100 is inside of the geofence or outside of the geofence. The wireless processor can be a WiFi™ chip. Monitoring the selected one or more wireless access points comprises scanning, on one or more channels, a signal from the selected one or more wireless access points. Mobile device 100 can wake an application processor of mobile device 100. Using the application processor, mobile device 100 can determine whether mobile device 100 is located inside of the geofence.

Exemplary Mobile Device Architecture

Figure 16:
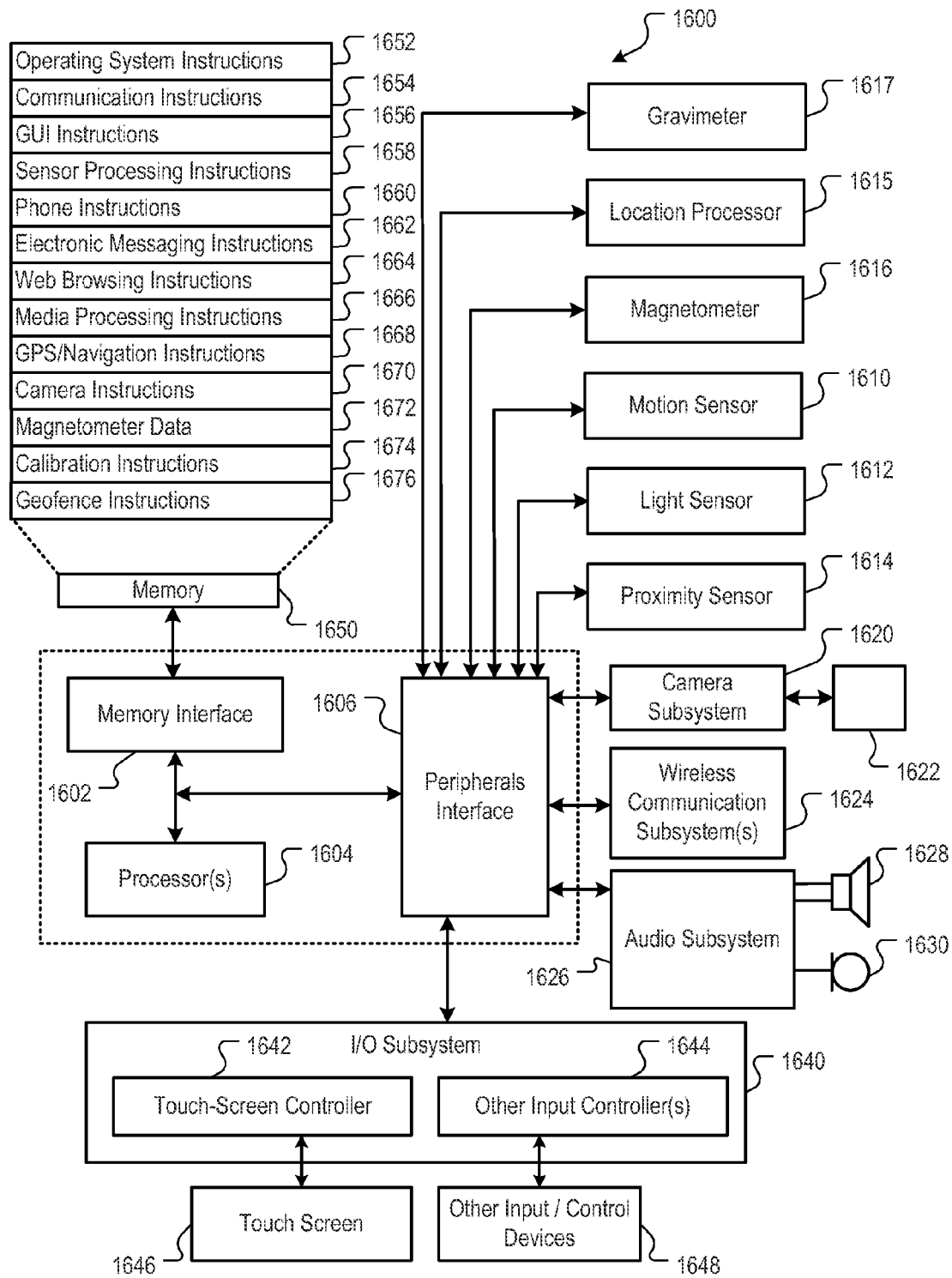
FIG. 16 is a block diagram illustrating an exemplary device architecture of a mobile device implementing the features and operations described in reference to FIGS. 1-15.

FIG. 16 is a block diagram of an exemplary architecture 1600 for the mobile devices of FIGS. 1-8. A mobile device can include memory interface 1602, one or more data processors, image processors and/or processors 1604, and peripherals interface 1606. Memory interface 1602, one or more processors 1604 and/or peripherals interface 1606 can be separate components or can be integrated in one or more integrated circuits. Processors 1604 can include application processors, baseband processors, and wireless processors. The various components in mobile device 100, for example, can be coupled by one or more communication buses or signal lines.

Sensors, devices, and subsystems can be coupled to peripherals interface 1606 to facilitate multiple functionalities. For example, motion sensor 1610, light sensor 1612, and proximity sensor 1614 can be coupled to peripherals interface 1606 to facilitate orientation, lighting, and proximity functions of the mobile device. Location processor 1615 (e.g., GPS receiver) can be connected to peripherals interface 1606 to provide geopositioning. Electronic magnetometer 1616 (e.g., an integrated circuit chip) can also be connected to peripherals interface 1606 to provide data that can be used to determine the direction of magnetic North. Thus, electronic magnetometer 1616 can be used as an electronic compass. Motion sensor 1610 can include one or more accelerometers configured to determine change of speed and direction of movement of the mobile device. Gravimeter 1617 can include one or more devices connected to peripherals interface 1606 and configured to measure a local gravitational field of Earth.

Camera subsystem 1620 and an optical sensor 1622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1624, which can include radio frequency receivers and transmitters and/or optical (e.g., infrared) receivers and transmitters. The specific design and implementation of the communication subsystem 1624 can depend on the communication network(s) over which a mobile device is intended to operate. For example, a mobile device can include communication subsystems 1624 designed to operate over a GSM network, a GPRS network, an EDGE network, a Wi-Fi or WiMax network, and a Bluetooth network. In particular, the wireless communication subsystems 1624 can include hosting protocols such that the mobile device can be configured as a base station for other wireless devices.

Audio subsystem 1626 can be coupled to a speaker 1628 and a microphone 1630 to facilitate voice-enabled functions, such as voice recognition, voice replication, digital recording, and telephony functions.

I/O subsystem 1640 can include touch screen controller 1642 and/or other input controller(s) 1644. Touch-screen controller 1642 can be coupled to a touch screen 1646 or pad. Touch screen 1646 and touch screen controller 1642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 1646.

Other input controller(s) 1644 can be coupled to other input/control devices 1648, such as one or more buttons, rocker switches, thumb-wheel, infrared port, USB port, and/or a pointer device such as a stylus. The one or more buttons (not shown) can include an up/down button for volume control of speaker 1628 and/or microphone 1630.

In one implementation, a pressing of the button for a first duration may disengage a lock of the touch screen 1646; and a pressing of the button for a second duration that is longer than the first duration may turn power to mobile device 100 on or off. The user may be able to customize a functionality of one or more of the buttons. The touch screen 1646 can, for example, also be used to implement virtual or soft buttons and/or a keyboard.

In some implementations, mobile device 100 can present recorded audio and/or video files, such as MP3, AAC, and MPEG files. In some implementations, mobile device 100 can include the functionality of an MP3 player, such as an iPod™ Mobile device 100 may, therefore, include a pin connector that is compatible with the iPod. Other input/output and control devices can also be used.

Memory interface 1602 can be coupled to memory 1650. Memory 1650 can include high-speed random access memory and/or non-volatile memory, such as one or more magnetic disk storage devices, one or more optical storage devices, and/or flash memory (e.g., NAND, NOR). Memory 1650 can store operating system 1652, such as Darwin, RTXC, LINUX, UNIX, OS X, WINDOWS, or an embedded operating system such as VxWorks. Operating system 1652 may include instructions for handling basic system services and for performing hardware dependent tasks. In some implementations, operating system 1652 can include a kernel (e.g., UNIX kernel).

Memory 1650 may also store communication instructions 1654 to facilitate communicating with one or more additional devices, one or more computers and/or one or more servers. Memory 1650 may include graphical user interface instructions 1656 to facilitate graphic user interface processing; sensor processing instructions 1658 to facilitate sensor-related processing and functions; phone instructions 1660 to facilitate phone-related processes and functions; electronic messaging instructions 1662 to facilitate electronic-messaging related processes and functions; web browsing instructions 1664 to facilitate web browsing-related processes and functions; media processing instructions 1666 to facilitate media processing-related processes and functions; GPS/Navigation instructions 1668 to facilitate GPS and navigation-related processes and instructions; camera instructions 1670 to facilitate camera-related processes and functions; magnetometer data 1672 and calibration instructions 1674 to facilitate magnetometer calibration. The memory 1650 may also store other software instructions (not shown), such as security instructions, web video instructions to facilitate web video-related processes and functions, and/or web shopping instructions to facilitate web shopping-related processes and functions. In some implementations, the media processing instructions 1666 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1650. Memory 1650 can include geofence instructions 1676 that can be used receive a geofence defined by a user, identifying one or more wireless access points for monitoring the geofence, monitoring the geofence using the identified wireless access points, and perform tasks associated with the geofence upon determining the mobile device is inside or outside the geofence.

Each of the above identified instructions and applications can correspond to a set of instructions for performing one or more functions described above. These instructions need not be implemented as separate software programs, procedures, or modules. Memory 1650 can include additional instructions or fewer instructions. Furthermore, various functions of the mobile device may be implemented in hardware and/or in software, including in one or more signal processing and/or application specific integrated circuits.

Exemplary Operating Environment

Figure 17:
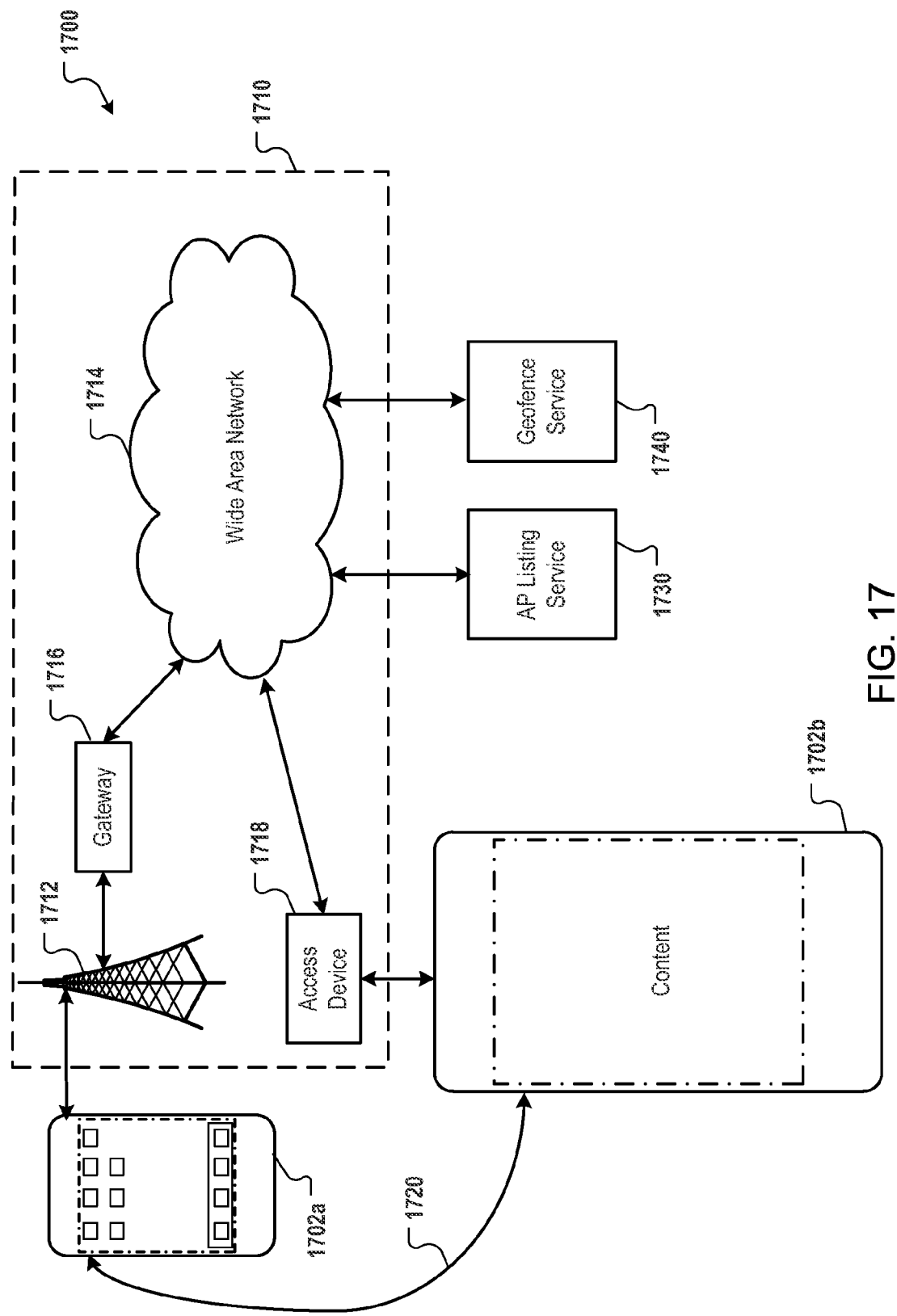
FIG. 17 is a block diagram of an exemplary network operating environment for the mobile devices of FIGS. 1-16.

FIG. 17 is a block diagram of an exemplary network operating environment 1700 for the mobile devices of FIGS. 1-9. Mobile devices 1702a and 1702b can, for example, communicate over one or more wired and/or wireless networks 1710 in data communication. For example, a wireless network 1712, e.g., a cellular network, can communicate with a wide area network (WAN) 1714, such as the Internet, by use of a gateway 1716. Likewise, an access device 1718, such as an 802.11g wireless access point, can provide communication access to the wide area network 1714.

In some implementations, both voice and data communications can be established over wireless network 1712 and the access device 1718. For example, mobile device 1702a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1712, gateway 1716, and wide area network 1714 (e.g., using Transmission Control Protocol/Internet Protocol (TCP/IP) or User Datagram Protocol (UDP)). Likewise, in some implementations, the mobile device 1702b can place and receive phone calls, send and receive e-mail messages, and retrieve electronic documents over the access device 1718 and the wide area network 1714. In some implementations, mobile device 1702a or 1702b can be physically connected to the access device 1718 using one or more cables and the access device 1718 can be a personal computer. In this configuration, mobile device 1702a or 1702b can be referred to as a "tethered" device.

Mobile devices 1702a and 1702b can also establish communications by other means. For example, wireless device 1702a can communicate with other wireless devices, e.g., other mobile devices, cell phones, etc., over the wireless network 1712. Likewise, mobile devices 1702a and 1702b can establish peer-to-peer communications 1720, e.g., a personal area network, by use of one or more communication subsystems, such as the Bluetooth™ communication devices. Other communication protocols and topologies can also be implemented.

The mobile device 1702a or 1702b can, for example, communicate with one or more services 1730 and 1740 over the one or more wired and/or wireless networks. For example, one or more access point listing services 1730 can determine one or more identifiers of wireless access points, estimate locations of the wireless access points using location data harvested from one or more location-aware device, determining AP scores for wireless access points, determine a channel for each wireless access point, and provide the information to mobile device 1702a or 1702b.

Geofence service 1740 can, for example, provide geofence-based API such that users of mobile device 1702a or 1702b can develop geofence-based application programs The application programs can be provided for download to mobile device 1702a or 1702b.

Mobile device 1702a or 1702b can also access other data and content over the one or more wired and/or wireless networks. For example, content publishers, such as news sites, Really Simple Syndication (RSS) feeds, web sites, blogs, social networking sites, developer networks, etc., can be accessed by mobile device 1702a or 1702b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention. For example, geographic regions used in wireless access point selection are represented as tiles. The collection of the geographic regions is represented as a grid. The actual shape of the geographic regions can vary.

What is claimed is:

1. A method performed by a mobile device, comprising:
    selecting, from a plurality of wireless access points, one or more wireless access points for monitoring a geofence, including:
        obtaining representations of a plurality of geographic regions corresponding to the geofence, wherein each geographic region is a portion of a geographic area enclosed by the geofence; and
        selecting the one or more wireless access points based on a maximum total number of wireless access points to be selected and a respective access point allowance for each of the geographic regions, each access point allowance indicating a maximum number of wireless access points to be selected for the corresponding geographic region, the access point allowance being distributed among the geographic regions in a grid in which an access point allowance of a geographic region that is located closer to a center of the geographic area enclosed by the geofence is higher than an access point allowance of a geographic region that is located farther away from the center;
    determining a tentative location of the mobile device relative to the geofence, including monitoring the selected one or more wireless access points, wherein during the monitoring, the mobile device accommodates a wireless scan capacity of a processor performing the monitoring by distributing the wireless scan capacity among the geographic regions according to the grid and the access point allowances, the grid causing the mobile device to distribute more wireless scan capacity to monitoring wireless access points that are detectable in the geographic region that is closer to the center of the geographic area; and
    upon determining the tentative location of the mobile device relative to the geofence by the wireless processor, determining whether the mobile device is inside of the geofence.

2. The method of claim 1, wherein the geofence is defined by a fence location and a fence dimension.

3. The method of claim 1, wherein
    the processor performing the monitoring is a wireless processor of the mobile device.

4. The method of claim 1, wherein determining a plurality of geographic regions corresponding to the geofence comprises dividing a geographic area associated with the geofence into a plurality of tiles, each geographic region corresponding to a tile.

5. The method of claim 4, wherein each wireless access point is associated with:
    an access point location associated with one of the geographical regions for monitoring; and
    an access point score indicating a worthiness of the wireless access point in monitoring the geofence.

6. The method of claim 5, wherein selecting the one or more wireless access points comprises:
   iteratively performing scoring operations, the scoring operations comprising:
      setting or increasing the access point allowance for each of the geographic regions; been added to a geographic region;
      ordering, based on the access point scores, wireless access points that have not yet
      adding, based on the access point allowance of each geographic region, a not yet added wireless access point to a destination geographic region, wherein the access point location associated with the not yet added wireless access point corresponds to the destination geographic region;
      designating already added access points as candidate wireless access points; and
      calculating a detection probability based on the candidate wireless access point; and
   selecting the one or more wireless access points from the candidate wireless access points based on the maximum total number of wireless access points and the detection probabilities calculated in the iterative scoring operations.

7. The method of claim 6, wherein selecting the one or more wireless access points is further based on communication channels between the mobile device and the wireless access points.

8. The method of claim 7, wherein selecting the one or more wireless access points comprises:
   determining one or more preferred wireless access points for each of the communication channels using a probability density function; and
   selecting the one or more wireless access points from the preferred wireless access points.

9. The method of claim 8, wherein determining one or more preferred wireless access points for each of the communication channels comprises:
   determining a popularity score of each of the communication channels using a probability density function and a number of wireless access points using the communication channel; and
   determining the one or more preferred wireless access points based on the popularity scores of the communication channels.

10. The method of claim 6, wherein the calculating the detection probability comprises:
   designating at least one point in each of the geographic regions as a probing point;
   calculating a probing point detection probability for each probing point, the probing point detection probability indicating a likelihood that a mobile device located at the probing point can detect any chosen access point for monitoring the geofence; and
   calculating the detection probability based on the probing point detection probabilities of the probing points, including calculating a probability of not detecting any of the selected access points at any of the probing points.

11. The method of claim 1, comprising selecting one or more wireless access points for monitoring another geofence, such that a total number of the selected wireless access points representing the geofence and the selected wireless access points representing the other geofence does not exceed the maximum number of wireless access points.

12. The method of claim 11, comprising iteratively determining whether to select one or more candidate wireless access points for monitoring the geofence or to select the one or more candidate wireless access points for monitoring the other geofence in each iteration based on an amount of improvement that results from each selection.

13. The method of claim 1, wherein monitoring the selected one or more wireless access points comprises scanning, on one or more channels, a signal from the selected one or more wireless access points.

14. The method of claim 1, wherein the wireless processor is a wireless chip.

15. The method of claim 1, comprising performing an action or stopping performing an action based on whether the mobile device is inside of the geofence.

16. A non-transitory computer-readable medium storing a computer program product configured to cause a mobile device to perform operations comprising:
   selecting, from a plurality of wireless access points, one or more wireless access points for monitoring a geofence, including:
      obtaining representations of a plurality of geographic regions corresponding to the geofence, wherein each geographic region is a portion of a geographic area enclosed by the geofence; and
      selecting the one or more wireless access points based on a maximum total number of wireless access points to be selected and a respective access point allowance for each of the geographic regions, each access point allowance indicating a maximum number of wireless access points to be selected for the corresponding geographic region, the access point allowance being distributed among the geographic regions in a grid in which an access point allowance of a geographic region that is located closer to a center of the geographic area enclosed by the geofence is higher than an access point allowance of a geographic region that is located farther away from the center;
   determining a tentative location of the mobile device relative to the geofence, including monitoring the selected one or more wireless access points, wherein during the monitoring, the mobile device accommodates a wireless scan capacity of a processor performing the monitoring by distributing the wireless scan capacity among the geographic regions according to the grid and the access point allowances, the grid and the access point allowances causing the mobile device to distribute more wireless scan capacity to monitoring wireless access points that are detectable in the geographic region that is closer to the center of the geographic area; and
   upon determining the tentative location of the mobile device relative to the geofence by the wireless processor, determining whether the mobile device is inside of the geofence.

17. The non-transitory computer-readable medium of claim 16, wherein the geofence is defined by a fence location and a fence dimension.

18. The non-transitory computer-readable medium of claim 16, wherein
   the processor performing the monitoring is a wireless processor of the mobile device.

19. The non-transitory computer-readable medium of claim 16, wherein determining a plurality of geographic regions corresponding to the geofence comprises dividing a geographic area associated with the geofence into a plurality of tiles, each geographic region corresponding to a tile.

20. The non-transitory computer-readable medium of claim 19, wherein each wireless access point is associated with:

an access point location associated with one of the geographical regions for monitoring; and
an access point score indicating a worthiness of the wireless access point in monitoring the geofence.

21. The non-transitory computer-readable medium of claim 20, wherein selecting the one or more wireless access points comprises:
iteratively performing scoring operations, the scoring operations comprising:
setting or increasing the access point allowance for each of the geographic regions;
ordering, based on the access point scores, wireless access points that have not yet been added to a geographic region;
adding, based on the access point allowance of each geographic region, a not yet added wireless access point to a destination geographic region, wherein the access point location associated with the not yet added wireless access point corresponds to the destination geographic region;
designating already added access points as candidate wireless access points; and
calculating a detection probability based on the candidate wireless access point; and
selecting the one or more wireless access points from the candidate wireless access points based on the maximum total number of wireless access points and the detection probabilities calculated in the iterative scoring operations.

22. The non-transitory computer-readable medium of claim 21, wherein selecting the one or more wireless access points is further based on communication channels between the mobile device and the wireless access points.

23. The non-transitory computer-readable medium of claim 22, wherein selecting the one or more wireless access points comprises:
determining one or more preferred wireless access points for each of the communication channels using a probability density function; and
selecting the one or more wireless access points from the preferred wireless access points.

24. The non-transitory computer-readable medium of claim 23, wherein determining one or more preferred wireless access points for each of the communication channels comprises:
determining a popularity score of each of the communication channels using a probability density function and a number of wireless access points using the communication channel; and
determining the one or more preferred wireless access points based on the popularity scores of the communication channels.

25. The non-transitory computer-readable medium of claim 21, wherein the calculating the detection probability comprises:
designating at least one point in each of the geographic regions as a probing point;
calculating a probing point detection probability for each probing point, the probing point detection probability indicating a likelihood that a mobile device located at the probing point can detect any chosen access point for monitoring the geofence; and
calculating the detection probability based on the probing point detection probabilities of the probing points, including calculating a probability of not detecting any of the selected access points at any of the probing points.

26. The non-transitory computer-readable medium of claim 16, the operations comprising selecting one or more wireless access points for monitoring another geofence, such that a total number of the selected wireless access points representing the geofence and the selected wireless access points representing the other geofence does not exceed the maximum number of wireless access points.

27. The non-transitory computer-readable medium of claim 26, the operations comprising iteratively determining whether to select one or more candidate wireless access points for monitoring the geofence or to select the one or more candidate wireless access points for monitoring the other geofence in each iteration based on an amount of improvement that results from each selection.

28. The non-transitory computer-readable medium of claim 16, wherein monitoring the selected one or more wireless access points comprises scanning, on one or more channels, a signal from the selected one or more wireless access points.

29. The non-transitory computer-readable medium of claim 16, wherein the wireless processor is a wireless chip.

30. The non-transitory computer-readable medium of claim 16, the operations comprising performing an action or stopping performing an action based on whether the mobile device is inside of the geofence.

31. A system, comprising:
a processor; and
a non-transitory storage device storing instructions configured to cause the processer to perform operations comprising:
selecting, from a plurality of wireless access points, one or more wireless access points for monitoring a geofence, including:
obtaining representations of a plurality of geographic regions corresponding to the geofence, wherein each geographic region is a portion of a geographic area enclosed by the geofence; and
selecting the one or more wireless access points based on a maximum total number of wireless access points to be selected and a respective access point allowance for each of the geographic regions, each access point allowance indicating a maximum number of wireless access points to be selected for the corresponding geographic region, the access point allowance being distributed among the geographic regions in a grid in which an access point allowance of a geographic region that is located closer to a center of the geographic area enclosed by the geofence is higher than an access point allowance of a geographic region that is located farther away from the center;
determining a tentative location of the mobile device relative to the geofence, including monitoring the selected one or more wireless access points, wherein during the monitoring, the mobile device accommodates a wireless scan capacity of a processor performing the monitoring by distributing the wireless scan capacity among the geographic regions according to the grid and the access point allowances, the grid and the access point allowances causing the mobile device to distribute more wireless scan capacity to monitoring wireless access points that are detectable in the geographic region that is closer to the center of the geographic area; and upon determining the tentative location of the mobile device relative to the geofence by the wireless processor, determining whether the mobile device is inside of the geofence.

32. The system of claim 31, wherein the geofence is defined by a fence location and a fence dimension.

33. The system of claim 31, wherein
the processor performing the monitoring is a wireless processor of the mobile device.

34. The system of claim 31, wherein determining a plurality of geographic regions corresponding to the geofence comprises dividing a geographic area associated with the geofence into a plurality of tiles, each geographic region corresponding to a tile.

35. The system of claim 34, wherein each wireless access point is associated with:
an access point location associated with one of the geographical regions for monitoring; and
an access point score indicating a worthiness of the wireless access point in monitoring the geofence.

36. The system of claim 35, wherein selecting the one or more wireless access points comprises:
iteratively performing scoring operations, the scoring operations comprising:
setting or increasing the access point allowance for each of the geographic regions;
ordering, based on the access point scores, wireless access points that have not yet been added to a geographic region;
adding, based on the access point allowance of each geographic region, a not yet added wireless access point to a destination geographic region, wherein the access point location associated with the not yet added wireless access point corresponds to the destination geographic region;
designating already added access points as candidate wireless access points; and
calculating a detection probability based on the candidate wireless access point; and
selecting the one or more wireless access points from the candidate wireless access points based on the maximum total number of wireless access points and the detection probabilities calculated in the iterative scoring operations.

37. The system of claim 36, wherein selecting the one or more wireless access points is further based on communication channels between the mobile device and the wireless access points.

38. The system of claim 37, wherein selecting the one or more wireless access points comprises:
determining one or more preferred wireless access points for each of the communication channels using a probability density function; and
selecting the one or more wireless access points from the preferred wireless access points.

39. The system of claim 38, wherein determining one or more preferred wireless access points for each of the communication channels comprises:
determining a popularity score of each of the communication channels using a probability density function and a number of wireless access points using the communication channel; and
determining the one or more preferred wireless access points based on the popularity scores of the communication channels.

40. The system of claim 36, wherein the calculating the detection probability comprises:
designating at least one point in each of the geographic regions as a probing point;
calculating a probing point detection probability for each probing point, the probing point detection probability indicating a likelihood that a mobile device located at the probing point can detect any chosen access point for monitoring the geofence; and
calculating the detection probability based on the probing point detection probabilities of the probing points, including calculating a probability of not detecting any of the selected access points at any of the probing points.

41. The system of claim 31, the operations comprising selecting one or more wireless access points for monitoring another geofence, such that a total number of the selected wireless access points representing the geofence and the selected wireless access points representing the other geofence does not exceed the maximum number of wireless access points.

42. The system of claim 41, the operations comprising iteratively determining whether to select one or more candidate wireless access points for monitoring the geofence or to select the one or more candidate wireless access points for monitoring the other geofence in each iteration based on an amount of improvement that results from each selection.

43. The system of claim 31, wherein monitoring the selected one or more wireless access points comprises scanning, on one or more channels, a signal from the selected one or more wireless access points.

44. The system of claim 31, wherein the wireless processor is a wireless chip.

45. The system of claim 31, the operations comprising performing an action or stopping performing an action based on whether the mobile device is inside of the geofence.

* * * * *

UNITED STATES PATENT AND TRADEMARK OFFICE
CERTIFICATE OF CORRECTION

PATENT NO. : 9,019,984 B2
APPLICATION NO. : 13/153268
DATED : April 28, 2015
INVENTOR(S) : Grosman et al.

It is certified that error appears in the above-identified patent and that said Letters Patent is hereby corrected as shown below:

In the claims

Column 27, Line 6-7 Claim 6, delete "regions; been added to a geographic region;" and insert -- regions; --, therefor.

Column 27, Line 9 Claim 6, delete "not yet" and insert -- not yet been added to a geographic region; --, therefor.

Column 30, Line 30 Claim 31, delete "processer" and insert -- processor --, therefor.

Signed and Sealed this
Tenth Day of November, 2015

Michelle K. Lee
*Director of the United States Patent and Trademark Office*